(12) United States Patent
Mizuno et al.

(10) Patent No.: US 7,443,776 B2
(45) Date of Patent: Oct. 28, 2008

(54) OPTICAL RECORDING METHOD

(75) Inventors: Masaaki Mizuno, Tokyo (JP); Hiroyuki Hoshino, Tokyo (JP); Takashi Ohno, Tokyo (JP); Michikazu Horie, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 78 days.

(21) Appl. No.: 11/700,470

(22) Filed: Jan. 31, 2007

(65) Prior Publication Data

US 2007/0127344 A1   Jun. 7, 2007

Related U.S. Application Data

(60) Division of application No. 11/151,491, filed on Jun. 13, 2005, which is a continuation of application No. PCT/JP03/15984, filed on Dec. 12, 2003.

(30) Foreign Application Priority Data

Dec. 13, 2002   (JP) .............................. 2002-363145

(51) Int. Cl.
G11B 7/0045 (2006.01)
(52) U.S. Cl. .................................... 369/59.12
(58) Field of Classification Search ............... 369/59.12
See application file for complete search history.

(56) References Cited

U.S. PATENT DOCUMENTS

| | | | |
|---|---|---|---|
| 5,412,626 A | 5/1995 | Ohno et al. |
| 5,818,808 A | 10/1998 | Takada et al. |
| 5,848,043 A | 12/1998 | Takada et al. |
| 6,256,277 B1 | 7/2001 | Saga et al. |
| 6,411,579 B2 | 6/2002 | Nobukuni et al. |
| 6,898,174 B2 | 5/2005 | Kuribayashi et al. |

| | | | |
|---|---|---|---|
| 2001/0053115 A1 | 12/2001 | Nobukuni et al. |
| 2002/0167878 A1 | 11/2002 | Nagano |
| 2003/0156519 A1 | 8/2003 | Yokoi |

(Continued)

FOREIGN PATENT DOCUMENTS

EP     0 388 897     10/1996

(Continued)

OTHER PUBLICATIONS

U.S. Appl. No. 09/573,319, filed May 18, 2000, Nobukuni et al.

(Continued)

*Primary Examiner*—Aristotelis M Psitos
(74) *Attorney, Agent, or Firm*—Katten Muchin Rosenman LLP

(57) ABSTRACT

In an optical recording method used when information is recorded in a phase-change recording layer of a large-capacity rewritable optical recording medium such as a DVD-RW, one block pulse is used as a recording pulse for forming one recording mark when a recording velocity is higher than a recording linear velocity at which the rewritable optical recording medium can be rewritten, whereas a pulse train comprised of a plurality of short pulses is used as the recording pulse for forming one recording pulse when the recording velocity is within recording linear velocities at which the rewritable optical recording medium can be rewritten, whereby high-velocity recording is realized.

6 Claims, 3 Drawing Sheets

U.S. PATENT DOCUMENTS

| | | |
|---|---|---|
| 2003/0210642 A1 | 11/2003 | Kuribayashi et al. |
| 2004/0052165 A1 | 3/2004 | Kuribayashi et al. |
| 2004/0248036 A1 | 12/2004 | Ohno et al. |

FOREIGN PATENT DOCUMENTS

| | | |
|---|---|---|
| EP | 0 902 424 | 5/2003 |
| JP | 4-21969 | 1/1992 |
| JP | 6-012674 | 1/1994 |
| JP | 8-287465 | 11/1996 |
| JP | 9-282661 | 10/1997 |
| JP | 2000-011380 | 1/2000 |
| JP | 2001-155339 | 6/2001 |
| JP | 2001-331936 | 11/2001 |
| JP | 2002-334442 | 11/2002 |
| JP | 2003-203340 | 7/2003 |
| JP | 2003-203345 | 7/2003 |
| WO | WO 2004/034386 | 4/2004 |

OTHER PUBLICATIONS

International Search Report dated Mar. 30, 2004.

Tatsuya Kato, et al. The Phase Change Optical Disc with the Data Recording Rate of 140 Mbps. The Japan Society of Applied Physics, p. 1664-1667, Part 1, No. 3B, Mar. 20002.

Natsuko Nobukuni, et al. High Speed Rewritable CD and DVD. Proceedings of the 12th Symposium on Phase Change Optical Information Storage, p. 52-55, Nov. 30, 2000.

Michikazu Horie, et al. High Speed Rewritable DVD up to 20m/s with nucleation free eutectic phase-change material of $Ge(Sb_{70}Te_{30})$+Sb. Proceedings of SPIE, Optical Data Storage 2000, May 14-17, 2000, p. 135-143.

Michikazu Horie, et al. Material Characterization and Application of Eutectic SbTe Based Phase-Change Optical Recording Media . . . Proceedings of SPIE, Optical Data Storage 2001, Apr. 22-25, 2001, p. 76-87.

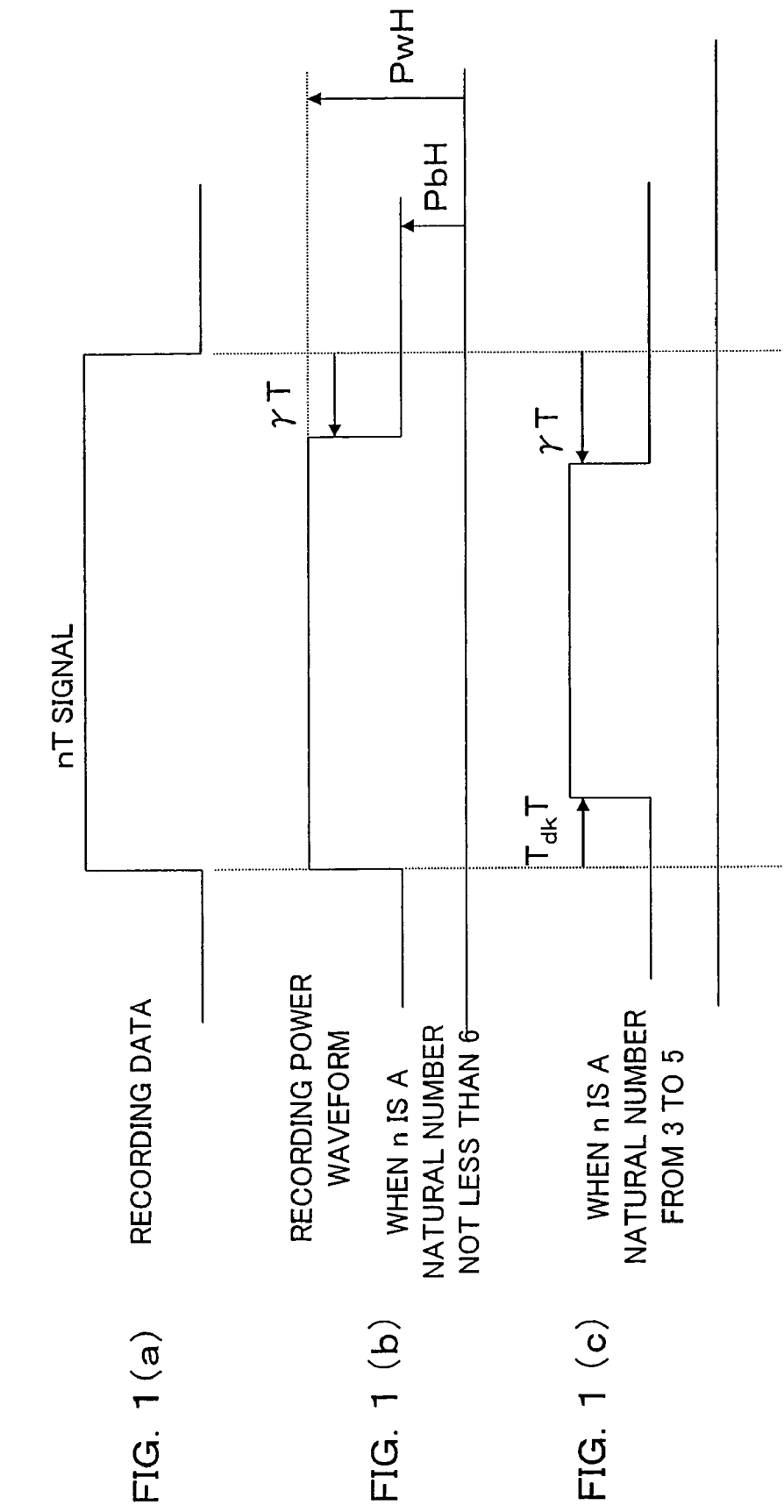

OPTICAL RECORDING METHOD

CROSS-REFERENCE TO RELATED APPLICATIONS

This application is a divisional of U.S. patent application Ser. No. 11/151,491, filed Jun. 13, 2005, which is a Continuation of International Application Number PCT/JP2003/015984 filed Dec. 12, 2003 and claims priority from Japanese Patent Application 2002-363145 filed Dec. 13, 2002, the contents of which are herein incorporated by reference.

TECHNICAL FIELD

The present invention relates to an optical recording method used for a large-capacity rewritable optical recording medium such as a DVD-RW or the like, and a recording/reproducing apparatus using this optical recording method.

BACKGROUND ART

Optical recording medium put to practical use are roughly classified into a read-only type, a write-once type and a rewritable type. Among them, recordable medium are the write-once type that can be recorded only once, and the rewritable type (rewrite possible type) that can be repetitively recorded and erased (can be rewritten).

A typical example of the write-once optical recording medium is CD-R having an organic dye recording layer, which penetrates widely in recent years. As the rewritable optical recording medium, a magneto-optical recording medium (magneto-optical disk) using the magneto-optical effect, and a phase-change optical recording medium (phase-change recording disk) using a difference in reflectance with a reversible change from the crystalline state to the amorphous state or vice versa are put into practice.

CD-RW, which is one of the rewritable optical recording medium, can be rewritten about a thousand times and is compatible with CD excepting the reflectance. Thus, the CD-RW widely penetrates in recent years. Medium of the rewritable type (for example, CD-RW) are more convenient for the user who prepares document files and the like as the recording medium as compared with medium of the write-once type (for example, CD-R) because the user can rewrite information sequentially.

Since an optical recording medium such as a CD-R or a CD-RW has a capacity insufficient to record motion picture data such as a movie, for example, there has been a demand for a large-capacity optical recording medium. As compared with both CD-R and CD-RW having a capacity of about 650 MB, DVD-R and DVD-RW having a capacity of about 4.7 GB, which is seven times the capacity of CD-R and CD-RW, are put into practice in recent years. As a result, use of a large-capacity DVD-R or DVD-RW enables the user to record a movie whole into one medium. Incidentally, DVD-R is a write-once optical recording medium having a dye recording layer, whereas DVD-RW is a rewritable phase-change optical recording medium.

CD-RW or DVD-RW, which is one of rewritable optical recording medium, is used differently from CD-R or DVD-R, which is one of write-once optical recording medium that can be recorded only once, according to its application. Namely, CD-RW and DVD-RW, and CD-R and DVD-R are distinguished from each other according to the application. For example, when the user needs to rewrite, the user uses a CD-RW or a DVD-R which is a rewritable optical recording medium. When there is no need to rewrite, the user uses a CD-R or a DVD-R which is a write-once optical recording medium. If the user ventures to use a medium of the rewritable type (for example, a CD-RW) as the write-once type (for example, CD-R), not only the user would fail to sufficiently use the potential of the rewritable medium, but also there is no need to use the medium of the rewritable type for it. Thus, such way of use is unusual.

As large-capacity DVD-R (hereinafter referred to as recordable DVD in this description) and DVD-RW (hereinafter referred to as rewritable DVD) are put into practical use as above, how to accomplish high-velocity recording becomes an important issue. In other words, when the capacity is increased, the size of information (data size) to be recorded is increased, which causes an increase in recording time. As compared with CD such as CD-R, CD-RW or the like having a relatively smaller capacity, DVD such as large-capacity recordable DVD, rewritable DVD or the like is required to realize high-velocity recording.

Although the recording linear velocity of the first generation recordable DVD is 3.49 m/s, a recordable DVD that can be recorded at a 4-times velocity is being put into practice. However, the 4-times velocity is considered to be still insufficient, the users thus strongly demand for a recording velocity not less than 8-times velocity.

However, the recordable DVD has a tendency that high-velocity recording causes thermal interference between recording marks. Accordingly it is said that high-velocity recording is difficult to be realized. In a recordable DVD using organic dye, a semiconductor laser beam at a wavelength in the neighborhood of 660 nm is applied to record a mark. In such recordable DVD, an increase in the recording velocity (that is, an increase in recording frequency) causes an increase in laser power required for recording as compared with the rewritable DVD, and causes a difficulty of securing a sufficient time period to allow heat generated by the laser beam for forming a recording mark to escape. For this reason, in the recordable DVD, the heat generated at the time of mark recording has a larger effect on formation of the preceding and following marks, which causes a difficulty of accurately forming recording marks. Such thermal interference causes a decrease in margin of the recording power at a recording linear velocity at a higher level in recordable DVD using organic dye. It is therefore considered that it is difficult to realize, in recordable DVD, recording at a high velocity not less than 8-times velocity.

On the other hand, the rewritable DVD does not practically have a problem because the thermal interference between recording marks is insignificant, but erasing is necessary when information is recorded (written). The rewritable recording velocity of the rewritable DVD thus still remains about 2.4 times.

DISCLOSURE OF INVENTION

In the light of the above drawbacks, an object of the present invention is to provide an optical recording method and a recording/reproducing apparatus using the optical recording method, which can realize high-velocity recording.

Therefore, the present invention provides an optical recording method in which a crystalline state of a phase-change recording layer of a rewritable optical recording medium having the phase-change recording layer is used as an unrecorded/erased state, and information is recorded by forming recording marks in an amorphous state with various time lengths nT (where T is a reference clock period, and n is an integer not less than 2), characterized in that:

(M-1) when a recording velocity is within a range of recording velocities at which recorded information in the rewritable optical recording medium can be rewritten, a plurality of recording marks with the time length of nT are formed;

dividing the time length nT into $\eta_1 T$, $\alpha_1 T$, $\beta_1 T$, $\alpha_2 T$, $\beta_2 T$, ... $\alpha_i T$, $\beta_i T$, ..., $\alpha_m T$, $\beta_m T$ and $\eta_2 T$ (where m is a pulse dividing number, i is an integer not less than 1 and not larger than m, $\Sigma_i(\alpha_i+\beta_i)+\eta_1+\eta_2=n$, $\alpha_i$ ($1\leq i\leq m$) is a real number larger than 0, $\beta_i$ ($1\leq i\leq m-1$) is a real number larger than 0, $\beta_m$ is a real number not less than 0, and $\eta_1$ and $\eta_2$ are real numbers not less than −2 and not larger than 2) in this order, where the pulse dividing number m for at least one time length of the recording marks is not less than 2, and the every time length of recording marks satisfies $n/m \geq 1.25$;

applying a recording beam having a recording power $Pw_i$ ($1\leq i\leq m$) during a time period of $\alpha_i T$;

applying a recording beam having a bias power $Pb_i$ ($1\leq i\leq m$, $Pb_i<Pw_i$, $Pb_i<Pw_{i+1}$) during a time period of $\beta_i T$;

applying a recording beam having an erasing power Pe (Pe is a value not less than any values of m $Pb_i$'s where $1\leq i\leq m$, and is a value smaller than any values of m $Pw_i$'s where $1\leq i\leq m$) on the spaces between the plural recording marks; and (M-2) when the recording velocity is higher than the recording velocity at which recorded information in the rewritable optical recording medium can be rewritten, a recording mark with a time length nT is formed with one block pulse in which a recording beam with a recording power PwH and a recording beam with a bias power PbH are applied.

Preferably, the bias powers $Pb_i$ and PbH are smaller than the erasing power Pe.

It is preferable that the optical recording method further comprises the steps of:

when the recording velocity is higher than the recording velocity at which recorded information in the rewritable optical recording medium can be rewritten, classifying the nT recording marks (where n is a natural number not less than $k_0$, where $k_0$ is 2 or 3) into recording marks with time lengths of $k_0 T$, ..., $(k_0+(k_1-1))T$ (where $k_1$ is an integer) and recording marks with time lengths of not less than $(k_0+k_1)T$, and allowing γ (where γ is a value not less than 0 and not larger than 2) to be varied according to n;

in the case of recording marks with the time length of $k_0 T$, ..., $(k_0+(k_1-1))TT$, forming the recording mark by starting radiation of the recording beam having the recording power PwH at a timing delayed by a time period $T_{dk}T$ (where $T_{dk}$ is a value between −1 and 1) from the start timing of the recording mark, and terminating the radiation of the recording beam having the recording power PwH at a timing advanced by a time period γT from the end timing of the recording mark; and in the case of recording marks with the time length not less than $(k_0+k_1)T$, forming the recording mark by starting radiation of the recording beam having the recording power PwH at the start timing of the recording mark, and terminating the radiation of the recording beam having the recording power PwH at a timing advanced by a time period γT from the end timing of the recording mark.

It is preferable that the optical recording method still further comprises the steps of:

when the recording velocity is in a range of recording velocities at which recorded information in the rewritable optical recording medium can be rewritten, a recording mark with a time length of nT is formed;

dividing a time length (n−j)T (where j is a real number from −2 to 2) in a recording mark of n=2 m (where m is a pulse dividing number, and is a natural number not less than 1) into m sections of $\alpha_i T$ and $\beta_i T$, comprised of $\alpha_1 T$, $\beta_1 T$, $\alpha_2 T$, $\beta_2 T$, ..., $\alpha_m T$ and $\beta_m T$ (provided $\Sigma_i(\alpha_i+\beta_i)=n-j$);

dividing a time length (n−k)T (where k is a real number from −2 to 2) in a recording mark of n=2 m+1 into m sections of $\alpha_i'T$ and $\beta_i'T$, comprised of $\alpha_1'T$, $\beta_1'T$, $\alpha_2'T$, $\beta_2'T$, ..., $\alpha_m'T$ and $\beta_m'T$ (provided $\Sigma_i(\alpha_i'+\beta_i')=n-k$);

when $m\geq 4$, $\beta_{i-1}+\alpha_i=\beta_{i-1}'+\alpha_i'=2\pm 0.2$ (where i is 3 to m−1);

applying a recording beam having the recording power $Pw_i$ (where i is an integer not less than 1 and not larger than m) during time periods of the $\alpha_i T$ and the $\alpha_i'T$; and applying a recording beam having the bias power $Pb_i$ (where i is an integer not less than 1 and not larger than m) during time periods of the $\beta_i T$ and the $\beta_i'T$.

It is preferable that the recording power $Pw_i$ is a constant value PwL within $1\leq i\leq m$; and the bias power $Pb_i$ is a constant value PbL within $1\leq i\leq m$.

It is preferable that at least one among $\alpha_1 \neq \alpha_1'$, $\beta_1 \neq \beta_1'$, $\alpha_2 \neq \alpha_2'$, $\beta_{m-1} \neq \beta_{m-1}'$, $\alpha_m \neq \alpha_m'$ and $\beta_m \neq \beta_m'$ is satisfied.

It is preferable that $\beta_{m-1} \neq \beta_{m-1}'$ and $\alpha_m \neq \alpha_m'$ are satisfied.

The present invention further provides a rewritable optical recording medium in which information can be recorded in the above optical recording method, characterized in that the phase-change recording layer of the rewritable optical recording medium has a composition containing Sb as a main component.

The present invention still further provides a recording/reproducing apparatus, in which a disk-shaped rewritable optical recording medium is mounted, and in a state of rotating the rewritable optical recording medium a recording beam is applied onto the rewritable optical recording medium for recording information, where the rewritable optical recording medium having a phase-change recording layer, in which a crystalline state of the phase-change recording layer is used as an unrecorded/erased state and recording marks in an amorphous state with various time lengths nT (where T is a reference clock period and n is an integer not less than 2) are formed in the unrecorded/erased state;

the recording/reproducing apparatus has three recording beam radiation modes; a rewritable recording mode, a write-once recording mode and a DC erasing mode;

(A-1) in the rewritable recording mode, recording on the rewritable optical recording medium is performed;

rotating the rewritable optical recording medium so that a linear velocity at a radial position of the rewritable optical recording medium for recording information therein is within a range of recording velocity at which the rewritable optical recording medium can be rewritten;

a plurality of recording marks with the time length nT are formed, dividing the time length nT into $\eta_1 T$, $\alpha_1 T$, $\beta_1 T$, $\alpha_2 T$, $\beta_2 T$, ..., $\alpha_i T$, $\beta_i T$, ..., $\alpha_m T$, $\beta_m T$ and $\eta_2 T$ (where m is a pulse dividing number, i is an integer not less than 1 and not larger than m, $\Sigma_i(\alpha_i+\beta_i)+\eta_1+\eta_2=n$, $\alpha_i$ ($1\leq i\leq m$) is a real number larger than 0, $\beta_i$ ($1\leq i\leq m-1$) is a real number larger than 0, $\beta_m$ is a real number not less than 0, and $\eta_1$ and $\eta_2$ are real numbers not less than −2 and not larger than 2) in this order, where the pulse dividing number m for the time length of at least one recording mark is not less than 2, and the every time length of recording marks satisfies n/m≧1.25;

applying a recording beam having a recording power $Pw_i$ (1≦i≦m) during a time period of $\alpha_i T$;

applying a recording beam having a bias power $Pb_i$ (1≦i≦m, $Pb_i<Pw_i$, $Pb_i<Pw_{i+1}$) during a time period of $\beta_i T$;

applying a recording beam having an erasing power Pe (Pe is a value not less than any values of m $Pb_i$'s where 1≦i≦m, and is a value smaller than any values of m $Pw_i$'s where 1≦i≦m) on the spaces between the plural recording marks, (A-2) in the write-once recording mode, recording on the rewritable optical recording medium is performed;

rotating the rewritable optical recording medium so that the linear velocity at a radial position of the rewritable optical recording medium for recording information therein is higher than the recording velocity range in which recorded information in the rewritable optical recording medium can be rewritten;

forming a recording mark with a time length nT with one block pulse in which a recording beam having a recording power PwH and a recording beam having a bias power PbH can be applied;

(A-3) in the DC erasing mode, recorded information in the rewritable optical recording medium is erased;

rotating the rewritable optical recording medium, so that the linear velocity at a radial position of the rewritable optical recording medium in in which recorded information is to be erased, is within the range of recording velocity in which the rewritable optical recording medium can be rewritten, applying a recording beam having an erasing power $P_{DC}$; and (A-4) when executing the write-once recording mode after executing the rewritable recording mode, or when again executing the write-once recording mode after executing the write-once recording mode, the DC erasing mode is executed to erase recorded information in the rewritable optical recording medium.

Preferably, the bias powers $Pb_i$ and PbH are smaller than the erasing power Pe.

It is preferable that the recording power $Pw_i$ is a constant value PwL within 1≦i≦m, and the bias power $Pb_i$ is a constant value PbL within 1≦i≦m.

It is preferable that the erasing power $P_{DC}$ in the DC erasing mode is equal to the erasing power Pe in the rewritable recording mode.

The present invention still further provides an optical recording method wherein information is recorded by forming recording marks in an amorphous state with various lengths on a crystalline state which is used as an unrecorded/erased state in a phase-change recording layer of a rewritable optical recording medium having the phase-change recording layer, characterized in that:

using one block pulse as a recording pulse to form one recording mark when a recording velocity is higher than a rewritable recording velocity, advancing the end timing of the block pulse by a first predetermined time period from the end timing of a data signal pulse when a length of the recording mark is not less than a predetermined length, delaying the start timing of the block pulse by a second predetermined time period from the start timing of the data signal pulse and advancing the end timing of the block pulse by a first predetermined time period from the end timing of the data signal pulse when the length of the recording mark is shorter than the predetermined length, and when the recording velocity is not higher than the rewritable recording velocity, using a pulse train comprised of a plurality of recording pulses as the recording pulse to form one recording mark. Particularly, it is preferable that the first predetermined time and the second predetermined time are changed according to a length of the recording mark.

Further, it is preferable that the pulse train is comprised of a forefront pulse at a recording power level, a following pulse train in which a pair of a cooling pulse at a cooling power level and a recording pulse at a recording power level is repeated, and a rearmost cooling pulse;

when a recording mark with a length of nT (where n is a natural number not less than 3, and T is a clock period) is formed, the sum of a pair of the pulse width of one cooling pulse and the pulse width of one recording pulse in the following pulse train is approximately 2 when n is an even number.

Moreover, preferably, the pulse train is comprised of a forefront pulse at a recording power level, a following pulse train in which a pair of a cooling pulse at a cooling power level and a recording pulse at the recording power level is repeated, and a rearmost cooling pulse;

when a recording mark with a length of nT (where n is a natural number not less than 3, and T is a clock period) is formed, the sum of a pair of the pulse width of one cooling pulse and the pulse width of one recording pulse in the following pulse train, excluding the sum of the first pair of a cooling pulse and a recording pulse and the sum of the last pair of a cooling pulse and a recording pulse among cooling pulses and recording pulses configuring said following pulse train, is approximately 2 when n is an odd number.

It is preferable that the pulse train is comprised of a forefront pulse at a recording power level, a following pulse train in which a pair of a cooling pulse at a cooling power level and a recording pulse at a recording power level is repeated, and a. rearmost cooling pulse;

when forming a recording mark with a length of nT (where n is a natural number not less than 3, and T is a clock period), an equal number of recording pulses forming the following pulse train is used irrespective of whether n is an odd number or an even number;

and when n is an odd number, in the following pulse train, making at least one pulse width selected among a pulse width of the first cooling pulse, a pulse width of the first recording pulse, a pulse width of the last cooling pulse, and a pulse width of the last recording pulse differ from a pulse width of the first cooling pulse, a pulse width of the first recording pulse, a pulse width of the last cooling pulse, and a pulse width of the last recording pulse respectively in case of n is an even number.

The present invention still further provides an optical recording method used when information is recorded by forming recording marks in an amorphous state with various lengths, on a crystalline state which is used as an unrecorded/erased state in a phase-change recording layer of a rewritable optical recording medium having the phase-change recording layer, characterized in that:

using one block pulse as a recording pulse to form one recording mark when a recording velocity is higher than a rewritable recording velocity, and when a length of the recording mark is shorter than a predetermined length, delaying the start timing of the block pulse by a predetermined time period which is longer than in case of recording marks longer than the predetermined length.

The present invention still further provides a recording/reproducing apparatus wherein information is recorded by forming recording marks in an amorphous state with various lengths, on a crystalline state which is used as an unrecorded/ erased state, in a phase-change recording layer of a rewritable optical recording medium having the phase-change recording layer, characterized in that:

using one block pulse as a recording pulse to form one recording mark when a recording velocity is higher than a rewritable recording velocity, advancing the end timing of the block pulse by a first predetermined time period from the end timing of a data signal pulse when a length of the recording mark is not less than a predetermined length, and delaying the start timing of the block pulse by a second predetermined time period from the start timing of the data signal pulse and advancing the end timing of the block pulse by a first predetermined time period from the end timing of the data signal pulse when the length of the recording mark is shorter than the predetermined length, and when the recording velocity is not higher than the rewritable recording velocity, using a pulse train comprised of a plurality of recording pulses as a recording pulse to form one recording mark.

According to the optical recording method and the optical recording/reproducing apparatus, a large-capacity rewritable optical recording medium such as a rewritable DVD is used as a write-once optical recording medium (write-once medium), and (a) recording pulse(s) according to a recording velocity is used, whereby high-velocity recording in a large-capacity optical recording medium can be realized.

BRIEF DESCRIPTION OF DRAWINGS

FIGS. 1(a) through 1(c) are diagrams for illustrating recording pulses used when writing is performed at a linear velocity not less than a predetermined recording linear velocity in an optical recording method according to an embodiment of this invention;

BEST MODE FOR CARRYING OUT THE INVENTION

Figures 2A, 2B, 2C:
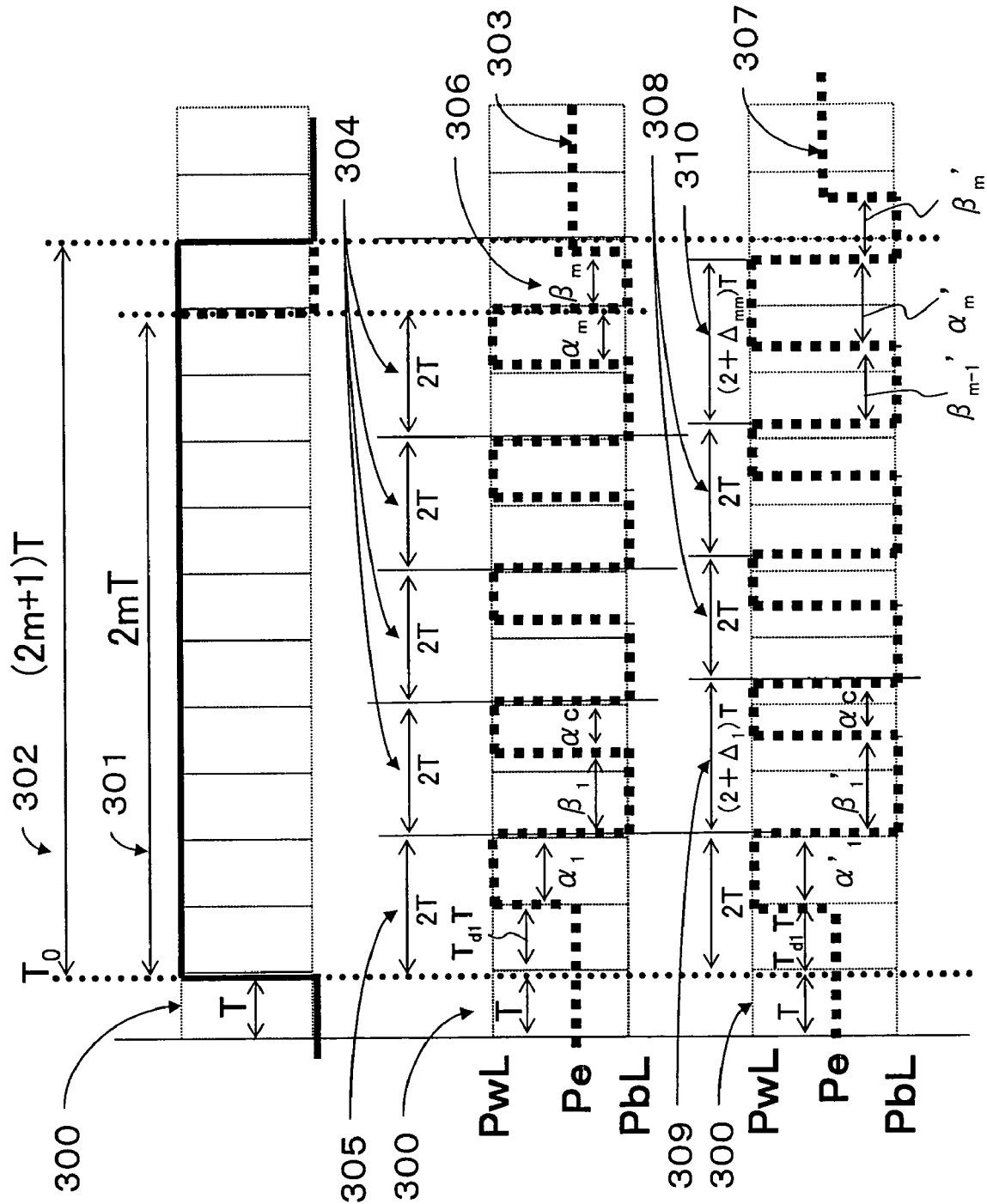
FIGS. 2(a) through 2(c) are diagrams for illustrating a 2T divided pulse strategy used when writing is performed at a linear velocity lower than the predetermined recording linear velocity in the optical recording method according to the embodiment of this invention.

Hereinafter, modes for carrying out the present invention will be described with reference to the drawings.

[1] Use of an Optical Recording Medium (Rewritable Optical Recording Medium) Having a Rewritable Phase-Change Recording Layer as a Write-Once Optical Recording Medium (Write-Once Medium)

In an optical recording medium having a phase-change recording layer (sometimes referred to simply as a phase-change optical recording medium or a rewritable optical recording medium; for example, a rewritable DVD or the like), a beam (for example, a laser beam) is applied onto the phase-change recording layer (sometimes referred to simply as a recording layer). The crystalline state of the phase-change recording layer is used as an unrecorded state or an erased state, and the amorphous state is used as a recorded state, whereby information is recorded.

In concrete, a plurality of recording marks in the amorphous state (in this specification, a recording mark in the amorphous state will be simply referred to as a recording mark or a mark, occasionally) having different lengths are formed in the phase-change recording layer to record information. Various kinds of information such as music data, image data, document data and the like are recorded by forming a plurality of recording marks (in the amorphous state) having different lengths in the phase-change recording layer in the crystalline state. By combining a part in the amorphous state (a recording mark; a recorded part) and a part in the crystalline state (between recording marks; an unrecorded part), information is recorded.

A recording mark in the amorphous state (referred to simply as an amorphous mark, occasionally) is formed by heating the recording layer to a temperature higher than the melting point by beam radiation, then rapidly cooling the same. When a sufficient cooling rate is not obtained at the time of rapid cooling, the amorphous mark is re-crystallized (that is, erased). Thus, an attention should be given to this.

Erasing (crystallizing) of the amorphous mark is performed by heating the recording layer by beam radiation, and keeping the temperature between the crystallization temperature and a temperature immediately above the melting point or below the melting point for several tens to several hundreds nanoseconds.

Generally, the higher the linear velocity (rewriting linear velocity) at the time of overwriting (rewriting), the steeper are the temperature distributions in the beam scanning direction (direction along the length of the amorphous mark) and a direction (vertical direction; a direction along the width of the amorphous mark) perpendicular to the beam scanning direction. For this reason, it becomes particularly difficult to keep the whole width of the amorphous mark at a temperature within the above temperature range for a sufficient period of time to crystallize the amorphous mark (erase the amorphous mark) when the linear velocity at the time of overwriting is high. When the crystallization (erasing) is insufficient, a portion around the amorphous mark remains un-erased. When a phase-change optical recording medium is used as a rewritable optical recording medium, the upper limitation of the linear velocity at which overwriting is possible is determined according to whether the above unerased portion remains or not.

Since a rewritable DVD, which is a large-capacity rewritable optical recording medium, needs erasing when information is recorded (written) therein, the recording linear velocity at which rewriting is possible still remains about 2.4-times velocity at present.

On the other hand, when a phase-change optical recording medium is used as a write-once optical recording medium such as a recordable DVD (that is, when a phase-change optical recording medium is used as a medium in which information is recorded only once in the phase-change recording layer in the initialized state or the crystalline state), for example, it is possible to attain recording at a higher linear velocity (writing linear velocity) than the linear velocity at which overwriting is possible (that is, to allow high-velocity) because there is no need to erase recorded information.

For example, since the whole surface of the phase-change recording layer is initialized to form the crystalline (erased) state after the phase-change optical recording medium is manufactured, it is possible to perform the first recording at a higher linear velocity than the linear velocity at which overwriting is possible. Even if information (data) is already recorded in the phase-change optical recording medium, it is also possible to perform recording at a higher velocity than the linear velocity at which overwriting is possible by recording the information after the information is erased by applying a DC beam (after the phase-change recording layer is returned to the crystalline state).

In the large-capacity recordable DVD using organic dye in the recording layer, it is thought that it is not easy to increase the linear velocity to not less than 8-times velocity since such DVD has a tendency that the effect of thermal interference between recording marks is larger. On the other hand, in the large-capacity rewritable DVD using a phase-change recording layer, the material of the recording layer, the structure of the layers and so forth differ from those of the recordable DVD using organic dye for the recording layer. For this, in the large-capacity rewritable DVD using a phase-change recording layer, the effect of the thermal interference is smaller than that in the recordable DVD using organic dye for the recording layer, it is thus possible to readily perform recording at higher linear velocity.

The possible number of recording times in the recordable DVD using organic dye for the recording layer is only once. An application suited to characteristics of such recordable DVD, for example, is to record official documents and the like, because recorded data cannot be altered. However, it is often desirable in general applications that the documents can be rewritten. Further, that the information can be rewritten, that is, the information can be repetitively recorded, is important because the load on the resources and environments can be decreased.

Aggressive and positive use of a rewritable optical recording medium such as a rewritable DVD having a phase-change recording layer, as a write-once optical recording medium (write-once medium) such as a recordable DVD, can omit necessity for erasing when information is recorded. Accordingly, in a large-capacity optical recording medium such as a DVD, recording (high-velocity recording) at a higher recording linear velocity (recording velocity), which is said to be difficult to be attained in a recordable DVD using organic dye for the recording becomes possible. Whereby, for example, large-capacity data, can be dubbed at a high velocity in a large-capacity optical recording medium such as a DVD. Additionally, positive use of a rewritable optical recording medium such as a rewritable DVD having a phase-change recording layer, as a write-once optical recording medium (write-once medium) such as a recordable DVD, can decrease the load on the resources and environments.

According to this embodiment, when information is recorded (written) in a rewritable DVD (rewritable optical recording medium) of a large capacity not less than 4 GB, for example, the phase-change recording layer is beforehand crystallized (erased) to enable writing so that erasing becomes unnecessary at the time of recording. By adopting such embodiment, writing at a higher recording linear velocity (high-velocity writing) becomes possible. Incidentally, such writing mode is called a write-once recording mode.

Whereby, the upper limitation of the recordable linear velocity can be raised and consequently broaden the range of the recordable linear velocities to a wider range.

Since the phase-change recording layer of a rewritable optical recording medium such as a rewritable DVD, for example, is in the crystalline state (erased state) as the initial state at the time of shipment or sale, the optical recording medium can be used as a write-once medium in this state. Even when information is already written in the phase-change recording layer (even when amorphous recording marks are already formed in the phase-change recording layer), it is possible to use the rewritable optical recording medium as a write-once medium by applying a DC beam and thereby changing the phase-change recording layer into the crystalline state (erased state) before information is written in the write-once recording mode.

Meanwhile, when a range of recordable liner velocities is narrow, there is possibility that use of such rewritable optical recording medium is limited even through the maximum recording linear velocity is high.

Recording in a rewritable DVD is generally performed in any one of CAV (Constant Angular Velocity) recording, PCAV (partial Constant Angular Velocity) recording, in both of which the rotational velocity is constant, CLV (constant Linear Velocity) recording and ZCLV (Zoned Constant Linear Velocity) recording, in both of which the linear velocity is constant.

In CLV recording, a lot of power is consumed to accelerate and decelerate the motor because the rotational velocity is frequently changed. CAV recording does not require changes in rotational velocity, thus the power consumption of the drive can be largely improved. Particularly, it is necessary to suppress the power consumption in a thin drive incorporated in a notebook-sized personal computer (PC). Thus, high-velocity CAV recording in a thin drive is desirable.

However, when CAV recording, in which the rotational velocity is constant, is performed in a rewritable DVD in order to shorten the recording time, the recording linear velocity at the outermost radius reaches about 2.5 times the recording linear velocity at the innermost radius. When the recording liner velocity at the innermost radius is 2.5-times velocity, the recording linear velocity at the outermost radius becomes 6-times velocity, for example. Accordingly, for the purpose of good CAV recording or PCAV recording, recording linear velocities in a wide range is required.

In order to cope with a wide range of recording linear velocity, it is considered to employ a recording method in which the writing strategy for controlling ON/OFF of the laser for recording mark formation is changed according to the recording linear velocity.

When the writing strategy is changed complicatedly according to the recording linear velocity, the load on the recording apparatus (drive, recording/reproducing apparatus) becomes too large. When change of the recording strategy according to the recording linear velocity is needed, simple change and high regularity are desirable.

The inventors of this invention intensively studied how to achieve recording at wide range of linear velocity with an easy control of the writing strategy. As a result, the inventors found out that it is desirable that the recording method is switched according to whether or not the recording linear velocity is not less than a predetermined recording linear velocity (for example, whether or not the recording linear velocity is not less than the maximum recording linear velocity at which rewriting is possible, that is, whether or not the recording linear velocity is higher than a predetermined recording linear velocity; for example, the recording linear velocity is higher than the rewritable maximum recording linear velocity at which rewriting is possible), when writing is performed without erasing at the time of recording (writing), with the phase-change recording layer of a rewritable optical recording medium (for example, a large-capacity rewritable DVD or the like) beforehand brought to the crystalline state (erased state), as will be described later.

Even when recording is performed in the write-once mode, rewriting (over-writing) is possible within a range of rewritable linear velocity.

[2] Optical Recording Method

When a rewritable optical recording medium such as a rewritable DVD having the phase-change recording layer is extensively used as a write-once optical recording medium as above, it is necessary to invent a recording method (optical recording method) by which recording at linear velocities in a wide range is possible.

According to the optical recording method of this invention, the crystalline state of the phase-change recording layer (having a composition containing antimony Sb as the main component, in particular) of a rewritable optical recording medium is used as the unrecorded/erased state, recording marks in the amorphous state with various lengths are formed therein to record information. In this optical recording method, when the recording velocity is not less than a predetermined recording velocity (for example, when the recording linear velocity is not less than the maximum recording linear velocity at which rewriting is possible, that is, when the recording velocity is higher than a predetermined recording velocity; for example, when the recording velocity is higher than the rewritable maximum recording linear velocity at which rewriting is possible in the rewritable optical recording medium), one block pulse is used as a recording pulse to form one recording mark. When the recording velocity is lower than the predetermined recording velocity (for example, when the recording linear velocity is lower than the rewritable recording linear velocity, that is, when the recording velocity is less than the predetermined recording velocity; for example, when the recording velocity is less than the rewritable maximum recording linear velocity at which rewriting is possible in the rewritable optical recording medium), a pulse train comprised of a plurality of recording pulses is used to form one recording mark.

According to this embodiment, the phase-change recording layer is in a crystalline state (erased state) when recording marks are formed in order to aggressively use a rewritable optical recording medium such as a rewritable DVD as a write-once disk.

When the user designates the recording velocity (writing velocity; for example, X-times velocity) to record information, for example, the designated recording velocity is inputted to the drive (recording/retrieving apparatus) (which is referred to as an inputted recording velocity), and the recording linear velocity is set on the drive's side (on the recording/retrieving apparatus's side) according to this (which is referred to as an inputted recording linear velocity).

The drive then determines whether the inputted recording velocity (inputted recording linear velocity) is equal to a predetermined recording velocity (predetermined recording linear velocity; for example, a rewritable linear velocity) in a rewritable optical recording medium inserted in the drive.

For example, when the rewritable optical recording medium (optical disk) is rotated at a constant linear velocity (CLV system), the drive determines whether or not the inputted recording linear velocity is not less than the predetermined recording linear velocity (for example, a linear velocity at which rewriting is possible in the inserted optical recording medium) (that is, whether or not the inputted recording linear velocity is higher than the predetermined recording linear velocity).

When the rewritable optical recording medium is rotated at a constant rotational velocity (CAV system), the linear velocity is set to have a predetermined range so that the linear velocity at the outer radius is higher than at the inner radius. For this, the drive determines whether or not the inputted recording linear velocities are all less than the predetermined recording linear velocity (for example, whether or not all the inputted recording liner velocities are not less than a rewritable linear velocity, that is, whether or not all the inputted recording linear velocities are higher than the predetermined recording linear velocity; for example, whether or not all the inputted recording linear velocities are faster than a linear velocity at which rewriting is possible in the inserted rewritable optical recording medium), for example. Alternatively, the drive may determine whether or not the linear velocity at the innermost radius (the lowest linear velocity) is not less than the predetermined recording linear velocity (for example, whether the linear velocity at the innermost radius is not less than the rewritable liner velocity, that is, the linear velocity at the innermost radius is higher than the predetermined recording linear velocity; for example, the linear velocity at the innermost radius is higher than a linear velocity at which rewriting is possible in the inserted rewritable optical recording medium).

When the recording velocity is higher than the predetermined recording velocity, one block pulse is used as recording pulses for forming one recording mark. When the recording velocity is not higher than the predetermined recording velocity, a pulse train consisting of a plurality of short pulses is used as recording pulses for forming one recording pulse. The details of the recording method in this case will be described later.

Hereinafter, the optical recording method according to this embodiment will be described more concretely by way of a rewritable DVD as being a phase-change optical recording medium.

[2A] Recording Method at a Recording Velocity (Linear Velocity) Higher than a Predetermined Recording Velocity (Predetermined Recording Linear Velocity; for Example, Rewritable Linear Velocity)

[2A-1] Recording Linear Velocity Range and Recording Method

In the current optical disk drives (recording/retrieving apparatus for optical recording medium), the upper limitation of the rotation speed of the spindle motor rotating an optical recording medium (hereinafter referred to as an optical disk or disk, occasionally) is about 10,000 rpm. Above this rotation speed, polycarbonate resin having a molecular weight of 12,000 to 20,000 generally used as substrates of optical disks might be broken due to the centrifugal force.

A rewritable DVD is generally in a disk shape having a diameter of 12 cm, having a recording region within a range of the radius of at least 23 to 58 mm (preferably 22 to 58 mm). The reference linear velocity of the rewritable DVD is 3.49 m/s. When the disk is rotated at about 10,000 rpm (CAV rotation), the linear velocity at the innermost radius in the recording region (position at a radius of 22 mm) is about seven times the reference line velocity, whereas the linear velocity at the outermost radius (position at a radius of 58 mm) in the recording region is about 17 times the reference linear velocity. Accordingly, about 17 times the reference linear velocity is the physical limitation of the recording velocity (writing velocity) of rewritable DVDs at this moment.

Currently, rewritable DVDs rewritable at a velocity, which is from 1 to 2.4 times the reference linear velocity, are put to practical use. In this case, a range of the rewritable linear velocities (range of the linear velocities at which writing is possible while erasing) is from 1 to 2.4 times the reference linear velocity. Accordingly, in rewritable DVDs put in practical use at present, the recording linear velocity higher than the rewritable recording linear velocity is within a range from larger than 2.4-times velocity to below about 17-times velocity. Incidentally, the upper limitation of the rewritable recording linear velocity in rewritable DVDs will be about 4- to 5-times velocity in future. Accordingly, a range of the recording linear velocity higher than the rewritable recording linear velocity will be from larger than 4- to 5-times velocity to not larger than about 17-times velocity.

The inventors of this invention intensively examined a recording method, by which amorphous marks can be properly recorded in a phase-change recording layer in the unrecorded or erased state (crystalline state) at a linear velocity (a recording velocity higher than the rewritable recording velocity) higher than the rewritable linear velocity in a large-capacity rewritable DVD.

When examining the recording method, the inventors of this invention paid attention to the following two points.

(1) When recording is performed at a high velocity such as a recording linear velocity higher than the rewritable linear velocity, a higher laser power is required to melt the phase-change layer as compared with recording at low velocity. However, the laser power cannot be higher than the maximum output power of the semiconductor laser. For this reason, it is important to skillfully control ON/OFF of the laser (ON/OFF of the laser for forming an amorphous recording mark being called writing strategy), as will be described later.

(2) It is also important to simplify the writing strategy. In CAV recording, a difference in linear velocity between the innermost radius and the outermost radius of the recording area is about 2.5 times. Accordingly, when recording is performed, starting from the inner radius toward the outer radius of the recording area of a rewritable DVD, the recording linear velocity is successively changed. It is thus necessary to change the writing strategy with a change in the recording linear velocity. It is required that the change in the writing strategy is as simple as possible, and can be readily controlled.

For phase-change optical recording medium, a recording strategy of that one recording mark is recorded with a plurality of short pulses (divided pulses) is employed. However, it was found that this writing strategy cannot be used at a recording linear velocity higher than the rewritable maximum recording linear velocity. A reason of this is that the whole laser power used to form a recording mark will be insufficient within a range of recording linear velocities higher than the rewritable maximum recording linear velocity if the writing strategy is formed with a plurality of short pulses. Additionally, since the laser has to be power-modulated (ON/OFF of the laser) at a high frequency, the laser driving circuit (control circuit for generation of divided pulses) is difficult to be designed.

For example, the clock period T (in this specification, clock period being represented by T, occasionally) at the reference linear velocity (3.49 m/s) of rewritable DVDs is about 38.2 nsec. Since a product VT of linear velocity V and clock period T at each linear velocity is constant, the clock period T at the 8-times velocity is about 4.8 nsec, that is, the time length of one period is not longer than 5 nsec. Laser pulse generally requires at least about 1 nsec to rise and fall. Accordingly, when the writing strategy is formed with a plurality of short pulses, heating recording layer above the melting point becomes extremely difficult at a linear velocity not less than eight times the reference linear velocity. The divided pulse strategy is heretofore employed to prevent the mark shape from being distorted when recording is performed with one pulse (block pulse) or prevent the amorphous mark from crystallizing because a sufficient cooling rate cannot be obtained (to secure the cooling rate when a recording mark in the amorphous state is formed).

As a result of intensive examination paying attention to the above points, the inventors of this invention found out, that when information is recorded in a phase-change recording layer in the crystalline state and the recording (writing) is performed at a recording linear velocity higher than a predetermined recording linear velocity (for example, a recording linear velocity higher than the rewritable maximum recording linear velocity), it is unnecessary to use the writing strategy with a plurality of short pulses, because a cooling rate sufficient to form an amorphous mark can be obtained even if recording is performed simply with one pulse (block pulse). As a result of further examination, the inventors of this invention found out that the lower limitation of the recordable (writable) linear velocity in the recording strategy with a block pulse is about the upper limitation of a range of the rewritable linear velocities.

Namely, when an amorphous mark is recorded in the phase-change recording layer in the crystalline state and the recording (writing) is performed at a linear velocity (a linear velocity within a range from the upper limitation of the rewritable linear velocity to a velocity determined on the basis of the physical limitation of the number of rotation of the disk) higher than a predetermined recording linear velocity (faster than the rewritable maximum recording linear velocity), it is preferable to use the writing strategy of one pulse.

With the writing strategy of one pulse, the present invention uses the following recording method.

Namely, an optical recording method in which information is recorded by forming recording marks in the amorphous state with various time lengths nT (where T represents reference clock period, and n representing an integer not less than two), on the crystalline state as unrecorded/erased state of a phase-change recording layer of a rewritable optical recording medium having the phase-change recording layer, wherein when the recording linear velocity is higher than a recording linear velocity at which recorded information in the rewritable optical recording medium can be rewritten, a recording mark with a time length nT is formed with one block pulse applying both a recording beam having a recording power PwH and recording beam having a bias power PbH.

In this invention, "reference clock period" will be referred to simply as "clock period," occasionally. In this invention, "block pulse" signifies a writing strategy with one pulse comprised of a recording beam having a recording power PwH and a recording beam having a bias power PbH. For example, a writing strategy shown in FIGS. 1(a) through 1(c) is referred to as the block pulse.

Conversely, it was found that if the recording linear velocity is set to a linear velocity not higher than a predetermined recording linear velocity (a recording velocity not higher than a predetermined recording velocity; for example, a linear velocity not higher than the rewritable maximum recording linear velocity, a linear velocity within a range of the rewritable recording linear velocities) when information is recorded in the phase-change recording layer in the crystalline state, recording with one pulse (block pulse) causes an insufficient cooling rate, thus formation of the amorphous mark is difficult. Accordingly, it was found that it is preferable to employ a writing strategy with divided recording pulses when the recording linear velocity is a linear velocity not higher than a predetermined recording linear velocity (a recording velocity not higher than a predetermined recording velocity; for example, a linear velocity not higher than the rewritable maximum recording linear velocity) in recording on the phase-change recording layer in the crystalline state. This point will be described in detail in [2B] below.

[2A-2] Practical Example

Hereinafter, description will be made of a practical example of the writing strategy with one pulse (block pulse) used at a linear velocity (a recording velocity) higher than a predetermined recording linear velocity (for example, higher than the rewritable maximum recording linear velocity).

According to this invention, preferable writing strategy with block pulses is below.

When the recording linear velocity is higher than a recording linear velocity at which recorded information in the rewritable optical recording medium can be rewritten, classifying the nT recording marks (n is a natural number not less than $k_0$, where $k_0$ is 2 or 3) into recording marks with time lengths of $k_0T, \ldots, (k_0+(k_1-1))T$ (where $k_1$ is an integer), and recording marks with time lengths of not less than $(k_0+k_1)T$, and allowing γ (where γ is a value not less than 0 and not larger than 2) to be varied according to n, in the case of a recording mark with the time length of $k_0T, \ldots, (k_0+(k_1-1))T$, forming the recording mark by starting radiation of the recording beam having a recording power PwH at a timing delayed by a time period of $T_{dk}T$ (where $T_{dk}$ is a value between −1 and 1) from the start timing of the recording mark, and terminating the radiation of the recording beam having the recording power PwH at a timing advanced by a time period γ T from the end timing of the recording mark, and in the case of a recording mark with the time length of not less than $(k_0+k_1)T$, forming the recording mark by starting radiation of the recording beam having a recording power PwH at the start timing of the recording mark, and terminating the radiation of the recording beam having the a recording power PwH at a timing advanced by a time period of γT from the end timing of the recording mark.

Hereinafter, the above writing strategy will be described using example where $k_0=3$ and $k_1=3$, with reference to FIGS. 1(a) through 1(c).

FIGS. 1(a) through 1(c) show an example of the writing strategy with one pulse used at a linear velocity higher than a predetermined recording linear velocity (higher than the rewritable maximum recording linear velocity). FIG. 1(a) shows a recording data signal (nT signal) for a recording mark in the amorphous state with a time length of nT (where n is 3 to 14, and T is clock period). FIG. 1(b) shows a recording power waveform in the writing strategy to form an nT mark, where n is not less than 6. FIG. 1(c) shows a recording power waveform in the writing strategy for n is 3, 4 or 5.

When n is not less than 6, that is, when a recording mark (amorphous mark) with a relatively long time length is formed, it is preferable to use a writing pulse strategy in which the laser with a recording power PwH is applied for a pulse length obtained by subtracting the pulse length γT from the pulse length nT. This signifies that when a recording mark with a length nT (where n is a natural number not less than 3, and T is a clock period) is formed and n is not less than 6 (that is, the recording mark length is not less than a predetermined length), for example, a timing at which the block pulse is ended is advanced by γT (the first predetermined time period) from the end timing of a nT data signal pulse (nT signal).

Here, γT is a compensation time for adjusting a mark length during recording so that the nT mark is accurately read out in retrieval. γT may be added to either the front end or the rear end of the recording mark. Preferably, γT is added to the rear end of the recording mark. By adding γT to the rear end, the shape of the rear end of the recording mark stables, and the retrieved jitter characteristic becomes excellent. Incidentally, γ is a value not less than 0 and not larger than 2, in general.

In order to control the mark length more accurately, it is preferable that γ is set as a function of n (that is, independently set according to n). In other words, it is preferable that γT can be changed according to n. However, if γ is set constant independently of n, design of the laser driving circuit (circuit for controlling generation of divided pulses) can be advantageously simplified.

When n is 3, 4 or 5, that is, when a recording mark (amorphous mark) with a relatively short time length is formed, it is preferable to employ a writing strategy in which the start timing of the recording pulse waveform is adjusted, and the above γT is added to the rear edge as well. By adjusting the start timing of the recording beam radiation having a recording power PwH forming the front end of the mark, it becomes possible to well correct a balance between a length of a long mark with a long time length (for example, a mark with n not less than 6; 6 T to 11 T, or 14 T mark) and a length of a short mark with a short time length (for example a mark with n smaller than 6; 3 T, 4 T, 5 T). Since shorter marks have a tendency that the front end of an amorphous mark formed by applying the recording beam is significantly shifted from the target position, the start timing of the recording beam radiation is adjusted only when a shorter mark is formed, whereby a good balance between the length of longer marks and shorter marks can be obtained. Thus, a value of the jitter becomes excellent, and excellent recording characteristics can be obtained.

Practically, as shown in FIG. 1(c), the start time of the recording pulse for the 3 T, 4 T or 5 T mark is delayed by $T_{dk}T$ (a predetermined time period) from the start time of the recording pulse for a recording mark with a time length of not less than 6 T. Namely, here is employed a writing pulse strategy in which the laser power having a recording power PwH is started at the timing delayed by $T_{dk}T$, and ended at the timing advanced by γT from nT, as compared with a recording mark with n not less than 6.

This signifies that when a recording mark with a length of nT (where n is a natural number not less than 3, and T is a clock period) and n is 3 to 5 (when the recording mark length is shorter than a predetermined length), the timing to start the block pulse (the start time to apply the recording beam of a recording power PwH) is delayed by $T_{dk}T$ (second predetermined time period) from the start timing of the data signal pulse (nT signal), and the end timing of the block pulse is advanced by γT (first predetermined time period) from the end timing of the data signal pulse (nT signal).

Here, it is preferable that $T_{dk}T$ is independently adjusted within a range from −1 T to +1 T when n is 3, 4 or 5. Namely, it is preferable that $T_{dk}$ is set as a function of n (that is, $T_{dk}$ is independently set according to n). In other words, it is preferable that $T_{dk}T$ can be changed according to n. However, if $T_{dk}T$ is set constant regardless of what n is among 3, 4 and 5, the design of the laser driving circuit (divided pulse generation control circuit) can be advantageously simplified.

Here, $T_{dk}T$ is positive when the start timing is delayed from the position of the front edge of the recording mark with a length of nT. When $T_{dk}T=-T$, radiation of the recording beam (laser beam) having a recording power PwH is started at the timing advanced by 1 T from the front edge of the recording mark of nT. Generally, $T_{dk}$ is a value not less than −1 and not larger than 1.

Here, when n is not less than 6 ($k_0=3$, $k_1=3$, $n=k_0+k_1$), it is assumed that the recording mark length is not less than a predetermined length. When n is 3 ($k_0=3$, $n=k_0$), 4 [$k_0=3$, $k_1=3$, $n=k_0+(k_1-2)$], or 5 [$k_0=3$, $k_1=3$, $n=k_0+(k_1-1)$], it is assumed that the recording mark length is shorter than the predetermined length. However, this invention is not limited to this example, but the value of n used to determine whether the recording mark is not less than the predetermined length may be arbitrarily set. The value of n is generally 4, 5 or 6. A reason of this is that shorter the time length of a mark, the more the front end of a formed amorphous mark is shifted from the desired position.

In the above recording strategy with one pulse, the time period for which the laser power is kept at a recording power PwH is proportional to the clock period T, as a general rule. For this, even when the recording linear velocity is changed according to a recording radius position in CAV recording, the above proportional relationship is kept (the factor of proportionality is fixed). Accordingly, a recording pulse can be readily formed, and recording at linear velocities within a wide range is possible.

PwH in FIGS. 1(b) and 1(c) represents a recording power level, which is a power heating the recording layer to above the melting point to form an amorphous mark. PbH represents a bias power level irradiated between amorphous marks.

Preferably, a relationship between PwH and PbH is set so that 0<PbH<Pe<PwH. Namely, it is preferable that PbH is smaller than Pe. Pe represents an erasing power. The erasing power Pe will be described later. Generally, PbH/PwH≦0.5. It is preferable that a relationship between PbH and Pe is PbH/Pe≦0.8. More preferably, PbH/Pe≦0.75. It is particularly preferable that PbH/Pe≦0.7.

When recording (writing) is performed with the phase-change recording layer brought to the crystalline state (unrecorded or erased state) as above, recording (for example, write-once) at a linear velocity (high linear velocity) higher than a predetermined recording velocity (for example, the rewritable maximum recording linear velocity) is possible. An amorphous mark recorded as above can be overwritten by recording (rewriting) at a linear velocity (low linear velocity) at which rewriting is possible (erasing is possible). The amorphous mark recorded as above can be erased by applying a DC beam having an erasing power level $P_{DC}$ at a rewritable linear velocity.

[2B] Recording Method (Pulse Dividing Method) in a Linear Velocity (Rewritable Linear Velocity Range; Recording Velocity) Not Higher than a Predetermined Recording Linear Velocity (Predetermined Recording Velocity)

[2B-1] Recording Linear Velocity Range and Recording Method

As described above in [2A-1], in the writing strategy using the above block pulse, the cooling rate is insufficient at a recording linear velocity not higher than a predetermined recording linear velocity (predetermined recording velocity; for example, the writable maximum recording linear velocity), thus forming of an amorphous mark becomes difficult. For this reason, at a linear velocity not higher than a predetermined recording linear velocity (for example, a recording linear velocity region not larger than the rewritable maximum recording linear velocity), it is preferable to employ a strategy in which a recording beam (laser beam) having a recording power to raise the temperature of the recording layer above the melting point, and a recording beam (laser beam) having a predetermined bias (cooling) power to cool the melted recording layer are alternately applied (using divided recording pulses) to secure the cooling of the melted region, and an amorphous recording mark is formed.

In the writing strategy using divided recording pulses, concretely, a writing strategy in which pulse train composed of a plurality (for example, a pulse dividing number is m) of recording pulses is used to form one recording mark, a laser beam having a constant recording power $Pw_i$ (where i satisfies $1 \leq i \leq m$) sufficient to melt the recording layer is applied on the recording layer by these plural recording pulses, and a laser beam having a bias (cooling) power $Pb_i$ (where i is within $1 \leq i \leq m$, $Pb_i < Pw_i$, and $Pb_i < Pw_{i+1}$) are applied on the recording layer among the recording pulses (in this specification, each space between recording pulses being referred to as a cooling pulse, occasionally).

As such writing strategy, a method of repetitively generating a pulse train composed of a plurality of recording pulses in a cycle about one times (1 T) the clock period is heretofore used. This is a method in which a time length obtained as the sum of the pulse width of one cooling pulse and the pulse width of one recording pulse is about one time of the clock period (1 T).

Since the clock period at the reference linear velocity on a rewritable DVD is 38.3 nsec, the clock period at the time of the 2-times velocity is 19.1 ns. Namely, in recording in a rewritable DVD, the clock period becomes below 25 ns when recording is performed at the 2-times velocity. When the clock period is not larger than 25 ns, the above known recording method, in which the time length obtained as the sum of the pulse width of one cooling pulse and the pulse width of one recording pulse is about 1 T, cannot sufficiently secure the melting time (time length of a recording pulse) and the cooling time (time length of a cooling pulse). Therefore, in a recording at a recording linear velocity at which the reference clock period T is not larger than 25 ns, use of the recording method of this invention, in which n/m (details of which will be described later) is not less than 1.25, is significant.

From the above reason, this invention uses a recording method, in which a time length obtained as the sum of the pulse width of one cooling pulse and the pulse width of one recording pulse is not less than about 1.25 times (1.25 T) of the clock period.

In contrast to the above known method, the recording method of this invention uses a writing strategy in which the period of each pulse composed of a plurality of recording pulses is larger than 1 T in order to cope with a recording at a higher recording linear velocity. According to this writing strategy, practically, the period of each pulse composed of a plurality of recording pulses is not less than about 1.25 times (1.25 T) the clock period. This is a method in which a time length obtained as the sum of the pulse width of one cooling pulse and the pulse width of one recording pulse is not less than about 1.25 times (1.25 T) the clock period (practically, 1.5 T, 2 T, 2.5 T, 5 T, 3 T, . . . ).

In this invention, a writing strategy of that the recording pulse repeats in about the clock period (1 T) is referred to as 1 T division pulse (1 T divided pulse writing strategy), for example. Similarly, a writing strategy of that the recording pulse repeats in a period about two times (2 T) the clock period is referred to as 2 T divided pulse (2 T divided pulse writing strategy), for example.

Hereinafter, description will be made of a writing strategy of that a pulse train period composed of a plurality of recording pulses is not less than about 1.25 times the clock period. As one of more practical methods of such writing strategy, the 2 T divided pulse recording strategy will be now described. Hereinafter, description will be made of particularly a case where the pulse train period is not less than 1.25 times the clock period, but the present invention can be applied to the 1 T divided pulse recording strategy, as a matter of course.

Note that the present invention is not limited to the 2 T divided pulse writing strategy, but may be applied to a recording strategy of that the pulse train repeats in a cycle 1.5 times (1.5 T), 2.5 times (2.5 T) 3 times (3 T) or the like the clock period, for example. In which case, characteristic points of this embodiment to be described later can be applied.

[2B-2] General Explanation

The 1 T pulse division heretofore used is that the pulse dividing number m is n−k (where k is 1 or 2). For example, when the pulse dividing number m is 10 in case of forming a 11 T mark (n=11), the sum of the pulse width of one cooling pulse and the pulse width of one recording pulse is 1.1 T (m=10, k=1). Namely, the recording pulse is repetitively regenerated at period of 1.1 T.

In the optical recording method of this invention, the pulse dividing number m is decreased, and the generating interval of the recording pulse is increased. By employing this method, the time length obtained as the sum of the pulse width of one cooling pulse and the pulse width of one recording pulse can be increased. Accordingly, the time length for which each recording pulse is generated can be increased, and the heating time of a beam-applied portion of the rewritable optical recording medium can be sufficiently increased with respect to the response speed (response time of ON/OFF of the recording pulse) of the recording pulse (laser pulse). Additionally, the time length for which the cooling pulse is generated can be increased, and the cooling time to form an amorphous recording mark can be sufficiently increased. As a result, recording with a proper mark length becomes possible even in a short clock period such as not larger than 25 ns. The optical recording method of this invention is particularly effective when the recording linear velocity is not less than 2-times velocity in a rewritable DVD.

The divided pulse writing strategy employed in this invention is as follows.

In an optical recording method in which a crystalline state of a phase-change recording layer of a rewritable optical recording medium having the phase-change recording layer is used as an unrecorded/erased state, and information is recorded by forming recording marks in the amorphous state with various time lengths nT (where T is a reference clock cycle, and n is an integer not less than 2), characterized in that:

when a recording velocity is within a range of recording velocities at which recorded information in the rewritable optical recording medium can be rewritten, a plurality of recording marks with the time length of nT are formed;

dividing the time length nT into $\eta_1 T$, $\alpha_1 T$, $\beta_1 T$, $\alpha_2 T$, $\beta_2 T$, ..., $\alpha_i T$, $\beta_i T$, ..., $\alpha_m T$, $\beta_m T$ and $\eta_2 T$ [where m is a pulse dividing number, i is an integer not less than 1 and not larger than m, $\Sigma_i(\alpha_i+\beta_i)+\eta_1+\eta_2=n$, $\alpha_i$ ($1 \leq i \leq m$) is a real number larger than 0, $\beta_i$ ($1 \leq i \leq m-1$) is a real number larger than 0, $\beta_m$ is a real number not less than 0, and $\eta_1$, $\eta_2$ are real numbers not less than −2 and not larger than 2] in this order, where the pulse dividing number m for at least one time length of the recording marks is not less than 2, and the every time length of recording marks satisfies $n/m \geq 1.25$, applying a recording beam having a recording power $Pw_i$ ($1 \leq i \leq m$) during a time period $\alpha_i T$, applying a recording beam having a bias power $Pb_i$ ($1 \leq i \leq m$, $Pb_i<Pw_i$, $Pb_i<Pw_{i+1}$) during a time period $\beta_i T$, applying a recording beam having an erasing power Pe (Pe is a value not less than any values of m $Pb_i$'s where $1 \leq i \leq m$, and is a value smaller than any values of m $Pw_i$'s where $1 \leq i \leq m$) on the spaces between the plural recording marks.

When the two or more recording marks with different time lengths nT are formed with the same dividing number m, it is preferable that $\alpha_1$ and/or $\beta_1$ in each of the two or more recording marks with different time lengths nT take different values. Namely, in the two or more recording marks with different time lengths nT with the same dividing number m, each time length of $\alpha_i T$ and $\beta_i T$ in any i within $1 \leq i \leq m$ is adjusted, and the time length of each two or more recording marks is differentiated.

According to the known 1 T-divided pulse, the pulse dividing number m is n−k (where k is 1 or 2). However, the present invention defines it from a different viewpoint.

According to this invention, with respect to at least one time length of the recording marks, the above pulse dividing number m is not less than 2. Namely, it is not always necessary to perform pulse division with m not less than 2 on all recording marks of nT. Particularly, in a short mark such as 3 T, 4 T or the like, a problem of heat accumulation is relatively small, and there is a case where the response of the pulse cannot catch up with it. Accordingly, it is more preferable to apply one pulse of the recording beam having a recording power $Pw_i$ ($1 \leq i \leq m$), or apply one pulse of the recording beam having a recording power $Pw_i$ ($1 \leq i \leq m$) and one pulse of the recording beam having a bias power $Pb_i$ ($1 \leq i \leq m$).

The feature of the above recording method is that the time length of every recording mark is $n/m \geq 1.25$.

If $\eta_1$ and $\eta_2$ are both 0, $\Sigma_i(\alpha_i+\beta_i)/m=n/m$. Accordingly, n/m is a value corresponding to an average value of $(\alpha_i+\beta_i)$, and $(n/m)T$ is a value corresponding to an average period (an average period of divided pulses) obtained as the sum of the pulse width of one cooling pulse and the pulse width of one recording pulse.

Since, in the known 1 T-divided pulse, m=n−k, and k is fixed to 1 or 2, thus $n/m=n/(n-1)$ or $n/m=n/(n-2)$. Since this value becomes smaller as n increases, n/m is the minimum when $n_{max}$ if the longest mark time length is $n_{max}T$. Namely, the average period (average period of divided pulses) obtained as the sum of the pulse width of one cooling pulse and the pulse width of one recording pulse is the longest in the shortest mark, while being the shortest in the longest mark. Thus, $\alpha_1 T$ and $\beta_i T$ are the shortest in the longest mark.

In EFM system employed in CD, n is 3 to 11, and k=2, hence $(n_{max}/m)$ is $11/(11-2)=1.22$. In EFM+system employed in DVD, n is 3 to 14, and k=2, hence $(n_{max}/M)$ is $14/(14-2)=1.16$. Similarly, in (1,7)-RLL-NRZI modulation system, n is 2 to 8, and k=1, hence $(n_{max}/m)$ is $8/(8-1)=1.14$.

As obvious from the above, in the known 1 T pulse division, the minimum value of n/m representing the average period (average period of divided pulses) obtained as the sum of the pulse width of one cooling pulse and the pulse width of one recording pulse is about 1.22, 1.16 or 1.14, thus every time length of recording mark does not hold $n/m \geq 1.25$. In the 1 T-divided pulse, when the reference clock period T is shorter than about 25 ns, it can be said that the average period of divided pulses in a recording mark having the above longest time length is about 25 ns. This signifies that the average value of recording pulse sections $\alpha_i T$ or the average value of off-pulse sections $\beta_i T$ is about 12.5 ns. This shows that either $\alpha_i T$ or $\beta_i T$ is about 12.5 ns in at least one i. Further, when the reference clock period T becomes not less than about 20 ns, either $\alpha_i T$ or $\beta_i T$ becomes further smaller.

In the above description, when any specific $\alpha_i$ or $\beta_i$ becomes longer than the average value, it signifies that another $\alpha_i$ or $\beta_i$ becomes further shorter. Thus, it remains unchanged that either $\alpha_i T$ or $\beta_i T$ becomes smaller.

Accurately, in the 1 T pulse division, $(\alpha_1+\beta_1)$ is not always equal to n, but may be n−η (where η is 0 to 2). In which case, the average values of $\alpha_i$ and $\beta_i$ become further smaller, thus the problem becomes more serious.

To solve the above problem, the optical recording method of this invention sets m so as to satisfy $n/m \geq 1.25$, for every time length of recording mark (for every n). As a result, $\alpha_i T$ and $\beta_i T$ are sufficiently long. In the 1 T pulse division, each of the recording pulse section $\alpha_i T$ and the off-pulse section $\beta_i T$ is approximately 0.5 T. By setting $n/m \geq 1.25$, it becomes possible to make each of the recording pulse section $\alpha_i T$ and the off-pulse section $\beta_i T$ longer than approximately 0.5 T to sufficiently heat the recording layer, while suppressing supply of the heat by the following pulse. Whereby, a sufficient cooling effect can be obtained.

Particularly, when the mark is long, the mark shape tends to be distorted due to heat accumulation. Accordingly, n/m is preferably not less than 1.5 for a mark having a time length of not less than 7 T. It is preferable that n/m is not less than 1.5 for a shorter mark of not larger than 6 T, as a matter of course. More preferably, n/m is not less than 1.8.

Since the heat accumulation becomes large when the value of n/m is excessively large, n/m is generally not larger than 4, preferably not larger than 3.5, and more preferably not larger than 3.

The shorter the reference clock period T, the larger is the effect provided by the optical recording method of this invention. For this, the clock period T is preferably not larger than 25 ns, more preferably not larger than 20 ns, and still more preferably not larger than 15 ns. However, an excessively short clock period cannot be obtained practically, the clock period T is generally not less than 0.1 ns, preferably not less than 1 ns, and more preferably not less than 3 ns. It is preferable that the smaller the clock period T, the larger the minimum value of n/m is set.

In this invention, parameters relating to divided pulses such as $\alpha_i$, $\beta_i$, $\eta_1$, $\eta_2$, $PW_i$, and $Pb_i$ can be suitably changed according to the mark length or i.

According to this invention, the average value of m recording pulse sections $\alpha_i T$ ($1 \leq i \leq m$) and the average value of (m−1) off-pulse sections $\beta_i T$ ($1 \leq i \leq m-1$) are both generally not less than 3 ns, preferably not less than 5 ns, and more preferably not less than 10 ns. Within this range, it is possible to secure the tracking performance of the applied beam. On the other hand, each $\alpha_i T$ ($1 \leq i \leq m$) and each $\beta_i T$ ($1 \leq i \leq m-1$) are preferably not less than 3 ns, more preferably not less than 5 ns, and still more preferably not less than 10 ns. Incidentally, the rise time and fall time of the power of the laser beam generally used in recording are preferably suppressed within time lengths which are not larger than 50% of the time lengths of the minimum $\alpha_i T$ ($1 \leq i \leq m$) and the time length of the minimum $\beta_i T$ ($1 \leq i \leq m-1$).

According to this invention, the beam may not be applied onto $\beta_m T$ which is the last off-pulse section by making $\beta_m$ to be 0. When the problem of heat accumulation at the read end of the mark is significant, it is preferable to set $\beta_m T$. In which case, $\beta_m$ is generally not less than 3 ns, preferably not less than 5 ns, and more preferable not less than 10 ns.

When the recording pulse section $\alpha_i T$ ($1 \leq i \leq m$) is not less than 3 ns, particularly, not less than 5 ns, it is possible to secure an irradiation energy necessary for recording by increasing the recording power $Pw_i$ although the problem of a rise/fall of the recording beam still remains.

On the other hand, when the off-pulse section $\beta_i T$ ($1 \leq i \leq m-1$) is not less than 3 ns, particularly not less than 5 ns, the cooling effect can be secured by decreasing the bias power Pb to the vicinity of the retrieving optical power Pr, or to 0 unless another problem occurs in the tracking servo.

In order to obtain a larger cooling effect, $\Sigma_i(\alpha_i)$ is generally smaller than 0.6 n, preferably smaller than 0.5 n, and more preferably not larger than 0.4 n, for every time length of recording marks. Namely, the sum of the recording pulse sections $\Sigma_i(\alpha_i T)$ is equal to the sum of the off-pulse sections $\Sigma_i(\beta_i T)$, or the sum of the recording pulse sections $\Sigma_i(\alpha_i T)$ is shorter than the sum of the off-pulse sections $\rho_i(\beta_i T)$ so that the off-pulse section are longer in each mark. Particularly preferably, $\alpha_i T \leq \beta_i T$ in all i, where i is 2 to m−1, and $\beta_i T$ is made longer in at least the second and later sections in the recording pulse train.

In the recording method of this invention, values of $\alpha_i$ ($1 \leq i \leq m$) and $\beta_i$ ($1 \leq i \leq m-1$) are suitably set according to values of recording pulse sections $\alpha_i T$ ($1 \leq i \leq m$), off-pulse sections $\beta_i T$ ($1 \leq i \leq m-1$) and so forth. Generally, $\alpha_i$ ($1 \leq i \leq m$) is a real number larger than 0. $\beta_i$ ($1 \leq i \leq m-1$) is a real number larger than 0. $\beta_m$ is a real number not less than 0. Practically, $\alpha_i$ ($1 \leq i \leq m$) and $\beta_i$ ($1 \leq i \leq m-1$) are generally not less than 0.01, preferably not less than 0.05, on the other hand, generally not larger than 5, and preferably not larger than 3.

Particularly, $\beta_i$ ($1 \leq i \leq m-1$) is more preferably not less than 0.5, and particularly preferably not less than 1 because an excessively small $\beta_i$ ($1 \leq i \leq m-1$) sometimes causes an insufficient cooling effect. When $\beta_i$ ($1 \leq i \leq m-1$) is excessively large, the recording mark may be optically separated because the recording mark is excessively cooled. Thus, $\beta_i$ ($1 \leq i \leq m-1$) is preferably not larger than 2.5, and particularly preferably not larger than 2. The effect provided by that $\beta_i$ ($1 \leq i \leq m-1$) is within the above range is particularly significant in the first off-pulse section $\beta_1 T$ that gives a large effect on the shape of the front end of the mark.

The same is true for the last off-pulse section $\beta_m T$ that gives a large effect on the shape of the rear edge of the mark. Thus, $\beta_m$ is generally not less than 0, preferably not less than 0.05, more preferably not less than 0.1, still more preferably not less than 0.3, and most preferably not less than 0.7, on the other hand, preferably not larger than 2.5, and particularly preferably not larger than 2.

For the purpose of simplification of the design of the divided pulse generation control circuit, it is preferable that the switching period of intermediate sections (group) $\alpha_i T$ ($2 \leq i \leq m-1$) between the first pulse section $\alpha_1 T$ and the last pulse section $\alpha_m T$ is a constant value. Practically, $(\alpha_i + \beta_i)T$ (where $2 \leq i \leq m-1$) or $(\beta_{i-1} + \alpha_i)T$ (where $2 \leq i \leq m-1$) is preferably 1.5 T, 2 T or 2.5 T.

According to this invention, a power $Pb_i$ of the recording beam to be irradiated on the off-pulse section $\beta_i T$ ($1 \leq i \leq m-1$) is smaller than a power $Pw_i$ and a power $Pw_{i+1}$ of the recording beam to be applied on the recording pulse sections $\alpha_i T$ and $\alpha_{i+1} T$. In order to obtain a large cooling effect, it is preferable that $Pb_i < Pw_i$ for every time length of recording marks. More preferably, $Pb_i/Pw_i \leq 0.5$ within $1 \leq i \leq m$, and more preferably $Pb_i/Pw_i \leq 0.2$ within $1 \leq i \leq m$. The bias power $Pb_i$ can be equal to a power Pr of a beam applied in retrieving. As a result, it is possible to simplify the setting of the divided pulse generation control circuit necessary for pulse division.

$Pb_i$ and $Pw_i$ may be changed according to i for the time length of one recording mark. Practically, $Pb_i$ and/or $Pw_i$ may be different values not less than 2 according to i for the time length of one recording mark. Particularly, values of the recording power $Pw_i$ in the first recording pulse section $\alpha_1 T$ and the recording power $Pw_m$ in the last recording pulse section $\alpha_m T$ are made differ from a value of the recording power $Pw_i$ ($2 \leq i \leq m-1$) in the intermediate recording pulse sections $\alpha_i T$ ($2 \leq i \leq m-1$), so that the mark shapes of the front edge and the rear edge of a mark can be accurately controlled. In order to simplify the setting of the divided pulse generation control unit, it is preferable that m−2 recording powers $Pw_i$ ($2 \leq i \leq m-1$) in the intermediate recording pulse sections $\alpha_i T$ ($2 \leq i \leq m-1$) are all the same power value as much as possible.

Similarly, it is preferable that the bias powers $Pb_i$ in the off-pulse sections $\beta_i T$ ($1 \leq i \leq m-1$) are all the same value as much as possible unless there is any reason. Alternatively, different values of $Pw_i$ and/or $Pb_i$ may be given to the same i in at least two recording marks having different n.

In this invention, how much power of the beam is applied to a space between marks in which no recording mark is formed is not limited, but preferably a beam having a power Pe within $Pb_i \leq Pe \leq Pw_i$ ($1 \leq i \leq m$) is applied. Pe is an erasing power for erasing a recorded mark.

More preferably, $Pb_i < Pe$. When overwriting is performed at a low linear velocity, recystallization after the recording layer of the optical recording medium is melted becomes significant (formation of an amorphous mark becomes difficult), in particular. For this reason, it is preferable that $Pb_i$ is as small as possible.

It is preferable to apply a beam having not less than the bias power $Pb_i$ and not larger than the erasing power Pe in the $\eta_1 T$ and $\eta_2 T$ sections. In order to simplify the setting of the divided pulse generation control circuit, it is preferable that the power of the beam applied in the $\eta_1 T$ and $\eta_2 T$ sections is equivalent to the bias power $Pb_i$, or equivalent to the erasing power Pe.

When a beam having the bias power $Pb_i$ is applied in the $\eta_1 T$ section, the beam having the bias power $Pb_i$ is applied in prior to the first recording pulse section $\alpha_1 T$. Thus, it is possible to decrease the effect of the retained heat from the preceding recording mark.

Physical functions of the recording power $Pw_i$ and the bias power $Pb_i$, or the erasing power Pe differ from each other according to the type of a used optical recording medium.

In the case of a rewritable optical recording medium with a phase-change recording layer, when recording is performed by bringing the recording layer to the amorphous state, $Pw_i$ is a power that can increase the temperature of the recording layer to at least its melting point. When overwriting is performed by amorphous recording or crystallization erasing is performed, Pe is a power that can increase the temperature of the recording layer to at least not less than the crystallizing temperature.

According to the type of a used rewritable optical recording medium, values of the recording power $Pw_i$ and the bias power $Pb_i$ are varied. In the case of a rewritable optical recording medium with a phase-change recording layer, for example, the recording power $Pw_i$ is about 1 to 100 mW, whereas the bias power $Pb_i$ is about 0.01 to 10 mW, in general.

Whatever the kind of a used medium, the recording power $Pw_i$ is a laser optical power necessary to increase the temperature of the recording layer to a temperature necessary to induce any optical change in the recording layer and keep that temperature, as the case may be. On the other hand, the bias power $Pb_i$ is a power lower than at least the recording power $Pw_i$. Generally, the bias power $Pb_i$ is lower than both the recording power $Pw_i$ and the erasing power Pe, and is a low power that does not induce any physical change in the recording layer.

In the recording method used in this invention, the same pulse dividing number m is used for at least two recording marks having different n in the time length nT. Generally, the same m is used for nT marks with neighboring time lengths such as 3 T mark and 4 T mark. With the same m, at least one of $\alpha_i$ ($1 \leq i \leq m$), $\beta_i$ ($1 \leq i \leq m$), $\eta_1$, $\eta_2$, $Pw_i$ ($1 \leq i \leq m$) and $Pb_i$ ($1 \leq i \leq m$) takes different values, whereby different time lengths of marks can be formed even with the same dividing number.

The dividing number m may be arranged irrespective of the magnitude of values of n. However, it is preferable that m is monotonously increased as the length of the mark is increased, that is, as n is increased (including that n and m are equal).

Generally, $\eta_1$ and $\eta_2$ are not less than −2 and not larger than 2. Within this region, a recording mark length of the time length nT can be accurately obtained.

A practical example of the pulse dividing system of this invention is shown below. This practical example is an example of the 2 T divided pulse strategy where n/m is about 2.

[2B-3] Practical Example of 2 T Divided Pulse Strategy

As a practical example of the 2 T divided pulse strategy, there is the following recording method. In the case where the recording linear velocity is in a range of recording linear velocities at which recorded information in the rewritable optical recording medium can be rewritten, a recording mark with a time length of nT is formed;

dividing a time length (n−j)T (where j is a real number from −2 to 2) in a recording mark of n=2 m (where m is a pulse dividing number, and is a natural number not less than 1) into m sections of $\alpha_i T$ and $\beta_i T$, comprised of $\alpha_1 T$, $\beta_1 T$, $\alpha_2 T$, $\beta_2 T$, ..., $\alpha_m T$ and $\beta_m T$ (provided $\Sigma_i(\alpha_i+\beta_i)=$n−j), dividing a time length (n−k)T (where k is a real number from −2 to 2) in a recording mark of n=2 m+1 into m sections of $\alpha_i' T$ and $\beta_i' T$ comprised of $\alpha_1' T$, $\beta_1' T$, $\alpha_2' T$, $\beta_2' T$, ... $\alpha_m' T$ and $\beta_m' T$ (provided $\Sigma_i(\alpha_i'+\beta_i')=$n−k), when $m \geq 4$, $\beta_{i-1}\alpha_i = \beta_{i-1}' + \alpha_i' = 2 \pm 0.2$ (where i is 3 to m−1), applying a recording beam having the recording power $Pw_i$ (where i is an integer not less than 1 and not larger than m) during the time periods of $\alpha_i T$ and $\alpha_i' T$; and applying a recording beam having the bias power $Pb_i$ (where i is an integer not less than 1 and not larger than m) during the time periods of $\beta_i T$ and $\beta_i' T$.

In this embodiment, it is preferable that the recording power $Pw_i$ is a constant value PwL within $1 \leq i \leq m$, and the bias power $Pb_i$ is a constant value within $1 \leq i \leq m$ in order to more simplify the pulse division generation control circuit.

More preferable embodiment of this embodiment will be now described with reference to FIGS. 2(a) through 2(c).

As shown in FIG. 2(a) through 2(c), when the recording linear velocity (write linear velocity; recording velocity) is a low linear velocity (for example, a linear velocity not higher than the rewritable maximum recording linear velocity) not higher than a predetermined recording linear velocity (predetermined recording velocity), m recording pulses of a recording power PwL are irradiated as divided pulses whereby an nT mark is recorded.

When n is an even number (n=2 m), the sum of the period of the pulse width of one recording pulse and the period of the pulse width of one cooling pulse is approximately 2 T.

On the other hand, when n is an odd number (n=2 m+1), the sum of the period of pulse width of the second recording pulse $\alpha_2' T$ and the period of pulse width of the cooling pulse $\beta_1' T$ in which a beam having a bias (cooling) power PbL is radiated immediately before the second recording pulse is $(2+\Delta_1)T$, the sum of the period of the last recording pulse $\alpha_m' T$ and the period of pulse width of the cooling pulse $\beta_{m-1}' T$ in which a beam having the bias (cooling) power PbL is radiated immediately before the last recording pulse is $(2+\Delta_{mm})T$, and another sums of the period of the recording pulse and the period of pulse width of the cooling pulse in which a beam having the bias (cooling) power PbL is radiated immediately before the recording pulse is approximately 2 T.

In this embodiment, as shown in FIGS. 2(a) through 2(c), when the recording velocity is not larger than a predetermined recording velocity (rewritable maximum recording linear velocity), a pulse train comprised of a plurality of recording pulses for forming one recording pulse is used, and this pulse train is composed of the first pulse at the recording power level, a following pulse train in which a pair of a cooling pulse at the bias (cooling) power level and a recording pulse at the recording power level is repeated, and the last cooling pulse.

When a recording mark having a length of nT (where n is a natural number not less than 3, and T is a clock period) is formed and n is an even number (n=2 m), the sum of the pulse width of one cooling pulse and the pulse width of one recording pulse, which are a pair, in the following pulse train is approximately 2.

On the other hand, when n is an odd number (n=2 m+1), with the exception of a pair of the first cooling pulse ($\beta_1$'T) and a recording pulse ($\alpha_2$'T) following the first cooling pulse and a pair of the last recording pulse ($\alpha_m$'T) and a cooling pulse ($\beta_{m-1}$'T) before the last cooling pulse among cooling pulses and recording pulses forming the following pulse train, the sum of the pulse width of a cooling pulse and the pulse width of a recording pulse, which are a pair, is approximately 2.

In summary, items common to both when n is an even number and when n is an odd number in this embodiment are as follows. Namely, the sum of the period of one recording pulse and the period of one cooling pulse which exist immediately before the recording pulse, is $\beta_{i-1}+\alpha_i$ or $\beta_{i-1}'+\alpha_i'$ where i is 3 to m−1 when the dividing number is not less than 4.

According to this embodiment, a number of pairs of a recording pulse and a cooling pulse is m, which is the same regardless of when n is an odd number (n=2 m+1) or when n is an even number (n=2 m).

This signifies that the number of recording pulses forming the following pulse train in the pulse train remains the same irrespective of whether n is an odd number of an even number. When n is an odd number, at least one selected among a pulse width of the first cooling pulse, a pulse width of the first recording pulse, a pulse width of the last cooling pulse and a pulse width of the last recording pulse forming the following pulse train is made different from a pulse width of the first cooling pulse, a pulse width of the first recording pulse, a pulse width of the last cooling pulse or a pulse width of the last recording pulse obtained when n is an even number.

This embodiment is characterized by that the pulse dividing number m used when n is an odd number (n=2 m+1) is equal to the pulse dividing number m used when n is an even number (n=2 m).

When n is an odd number, at least one of the first pulse $\alpha_1$', $\beta_1$' of the first cooling pulse forming the following pulse train, $\alpha_2$' of a recording pulse following the first cooling pulse, $\alpha_m$' of the last recording pulse, $\beta_{m-1}$' of the cooling pulse before the last recording pulse and $\beta_m$' of the last cooling pulse is suitably adjusted for $\alpha_1$, $\beta_1$, $\alpha_2$, $\beta_{m-1}$, $\alpha_m$ and $\beta_m$ used when n is an even number with the same pulse dividing number m. Namely, it is preferable that at least one of $\alpha_1 \neq \alpha_1'$, $\beta_1 \neq \beta_1'$, $\alpha_2 \neq \alpha_2'$, $\beta_{m-1} \neq \beta_{m-1}'$, $\alpha_m \neq \alpha_m'$ and $\beta_m \neq \beta_m'$ is satisfied.

Meanwhile, a period during which a beam having the bias power PbL following the last recording pulse in the following pulse train, that is, the end time of the last period $\beta_m$T or $\beta_m$'T is not always synchronized with the end time of the data signal pulse forming a recording mark nT or (n+1)T.

As a more preferable recording method for using the above 2 T divided pulse strategy to a rewritable DVD, there is the following recording method.

Namely, a recording method for a rewritable optical recording medium, wherein if the recording linear velocity is not higher than a predetermined recording linear velocity (rewritable maximum recording linear velocity), a recording mark with a time length of nT (where n is a natural number not less than 3) is formed;

dividing a time length (n−j)T (where j is a real number form −2 to 2) of a recoding mark (an even-number-length mark) of n=2 m (where m is a natural number not less than 2) into m sections of $\alpha_i$T and $\beta_i$T, comprised of $\alpha_1$T, $\beta_1$T, $\alpha_2$T, $\beta_2$T, ..., $\alpha_m$T, and $\beta_m$T (provided $\Sigma_i(\alpha_1+\beta_i)$=n−j), dividing a time length (n−k)T (where k is a real number from −2 to 2) of a recording mark (an odd-number-length mark) of n=2 m+1 (where m is a natural number not less than 1) into m sections of $\alpha_i$'T and $\beta_i$'T, comprised of $\alpha_1$'T, $\beta_1$'T, $\alpha_2$'T, $\beta_2$'T, ..., $\alpha_m$'T, and $\beta_m$'T (provided $\Sigma_i(\alpha_i'+\beta_i')$=n−k), applying a laser beam having a recording power PwL for time periods of recording pulses $\alpha_i$T and $\alpha_i$'T (where i is an integer from 1 to m)

applying a laser beam having a bias (cooling) power PbL for time periods of cooling pulses of $\beta_i$T and $\beta_i$'T (where i is an integer from 1 to m) to form a recording mark of a time length nT, wherein $\beta_{i-1}+\alpha_i$ and $\beta_{i-1}'+\alpha_i'$ each is approximately 2 within a range of i from 2 to m (except when i=2 and/or i=m).

Here, $\beta_{i-1}+\alpha_i$ and $\beta_{i-1}'+\alpha_i'$ (where i is 2 to m) each is approximately 2, where an error of fluctuation or the like inevitably generating in the design of the laser driving circuit (divided pulse generation control circuit) is possibly considered. Practically, a difference of approximately 0.1 T (preferably approximately 0.2 T) is considered to be equivalent. Namely, $\beta_{i-1}+\alpha_i=\beta_{i-1}'+\alpha_i'=2\pm 0.1$ (preferably 2±0.2) (where i is 2 to m).

With respect to i=2 and/or i=m, that is, $\beta_1+\alpha_2$ and/or $\beta_{m-1}+\alpha_m$ in an even-number-length mark, it is better to positively consider a deviation from 2 within a range of about ±0.3, whereby more accurate jitter control on the mark length and the mark end may become possible. In which case, $\beta_{i-1}+\alpha_i$ present between $\beta_1+\alpha_2$ and $\beta_{m-1}+\alpha_m$ may be approximately 2.

With respect to i=2 and/or i=m, that is, $\beta_1'+\alpha_2'$ and/or $\beta_{m-1}'+\alpha_m'$, in an odd-number-length mark, it is better to consider a deviation from 2 within a range of at least 0.5 to 2, as well. Doing so enables a more accurate jitter control on the mark length and the mark end. In which case, $\beta_{i-1}'+\alpha_i'$ present between $\beta_1'+\alpha_2'$ and $\beta_{m-1}'+\alpha_m'$ may be approximately 2.

Hereinafter, the above 2 T divided pulse strategy will be described more practically with reference to FIGS. 2(a) through 2(c) and FIGS. 3(a) through 3(c).

FIGS. 2(a) through 2(c) are diagrams showing an example of a relationship among recording pulses in a recording strategy in the 2 T divided pulse strategy to form an nT recording mark of n=2 m or n=2 m+1. Strictly speaking, time widths of recording pulses and cooling pulses to form a mark length of 2 mT in FIG. 2(b) should be represented as $\alpha_1$T, $\beta_1$T, $\alpha_c$T, ..., $\alpha_m$T and $\beta_m$T. However, in FIG. 2(b), they are simply represented as $\alpha_1$, $\beta_1$, $\alpha_c$, ..., $\alpha_m$ and $\beta_m$, and representation of clock period T is omitted, for the sake of providing an easy-to-see drawing. This is the same in FIG. 2(c).

As shown in FIGS. 2(a) through 2(c), the above 2 T divided pulse strategy is differently operated according to whether the value of n of the nT mark is an odd number or an even number. The compensation of a difference 1 T in mark length between an even-number-length mark and an odd-number-length mark with the same dividing number m is distributed to an off-pulse section $\beta_1$T following the first recording pulse and the second recording pulse period $(\beta_{m-1}+\alpha_m)$T from the last, and assigned to the same. Namely, $\beta_1 \neq \beta_1'$, $\beta_{m-1} \neq \beta_{m-1}'$ and $\alpha_m \neq \alpha_m'$, and the compensation of a mark length 1 T is done by adjusting off-pulse lengths $\beta_1$T and $\beta_{m-1}$T, and the last recording pulse section pulse $\alpha_m$T.

In FIGS. 2(a) through 2(c), reference character 300 designates a reference clock of a period T.

FIG. 2(a) is a pulse waveform corresponding to a length nT=2 mT or nT=(2 m+1)T, wherein reference numeral 301 corresponds to a length of a recording mark with a length of 2 mT, and reference numeral 302 corresponds to a length of a recording mark with a length of (2 m+1)T. FIG. 2(a) shows an example where m=5.

Reference numeral 303 in FIG. 2(b) is a waveform of divided recording pulses in the case of n=2 m (=10), whereas reference numeral 307 in FIG. 2(c) is a waveform of divided recording pulses in the case of n=2 m+1 (=11).

A value obtained by multiplying $T_{d1}$ by T is a delay time of $\alpha_1 T$ and $\alpha_1' T$ from the front edge $T_0$ of nT marks, which is generally constant irrespective of n. The delay time is positive when the front edge is delayed from the front edge of a recording mark with a length nT.

Generally, $(T_{d1}+\alpha_1)T=(T_{d1}+\alpha_1')T=2$ T is set for the purpose of easy synchronism in the recording pulse generating circuit (divided pulse generation control circuit). Note that $(T_{d1}+\alpha_1)T$ and $(T_{d1}+\alpha_1')T$ may be finely adjusted within a range of approximately ±0.5 T. Particularly, in 3 T, 4 T and 5 T marks, it is preferable that $T_{d1}T$ is finely adjusted. The recording power level in recording pulse sections $\alpha_i T$ (where i is 1 to m) is PwL and constant. The bias (cooling) power level in off-pulse sections $\beta_i T$ (where i is 1 to m) is PbL and constant. The power of an applied beam in a section between a recording mark and a recording mark, that is, a section between recording marks excepting $\alpha_i T$ (where i is 1 to m) and $\beta_i T$ (where i is 1 to m), is an erasing power Pe and constant.

When n is an even number, $(\beta_{i-1}+\alpha_i)T=2$ T (where i is 2 to m), which is constant, in a section 304 [that is, a section excepting 305 and 306 in FIG. 2(b)] excluding the first recording pulse and the last off-pulse. Here, an error of approximately ±0.2 T can be allowed as stated above nevertheless "$(\beta_{i-1}+\alpha_i)T$ is 2 T and constant." Note that only $(\beta_1+\alpha_2)T$ and $(\beta_{m-1}+\alpha_m)T$ can be finely adjusted within a range of ±0.3 T.

When n is an odd number, $(\beta_{i-1}'+\alpha_i')T=2$ T (where i is 3 to m−1), which is constant, in a section denoted by a section 308 in FIG. 2(c).

In order to record two kinds of recording marks of n=2 m and 2 m+1 with the same dividing number, a section $(\beta_1+\alpha_2)T$ and a section $(\beta_{m-1}+\alpha_m)T$ of the recording mark of n=2m are increased and decreased by about 0.5 T, respectively, to adjust the lengths, thereby forming the recording mark of n=2 m+1. This value is not always accurately 0.5 T due to an effect of thermal interference and the like, but is approximately within a range from 0.3 T to 0.6 T.

In FIG. 2(c), recording of a difference 1 T in mark length between the even-number-length mark nT=10 T and the odd-number-length mark nT=11 T is performed in the following operations 1 and 2.

Operation 1: as seen in a section 309 in FIG. 2(c), $\Delta_1$ is added to only $\beta_1'$ in a section $(\beta_1'+\alpha_2')T$ to yield $\beta_1'=\beta_1+\Delta_1$ and $\alpha_2'=\alpha c$.

Operation 2: As in a section 310 in FIG. 2(c) $\Delta_{mm}T$ is added to a section $(\beta_{m-1}'+\alpha_m')$.

Here, it is possible to set $\Delta_{mm}=\Delta_{m-1}+\Delta_m$, divide $\Delta_{mm}$ into $\Delta_{m-1}$ and $\Delta_m$, add $\Delta_{m-1}$ to $\beta_{m-1}$, and add $\Delta_m$ to $\alpha_m$. Incidentally, either one of $\Delta_{m-1}$ and $\Delta_m$ may be zero.

Preferably, $\Delta_m$ is larger than 0, that is, $\alpha_m \neq \alpha_m'$. By making $\Delta_m$ larger than 0, the shape of the rear edge of a recording mark whose n is an odd number with the same dividing number m becomes stable, and the jitter characteristic is noticeably improved. More preferably, values of $\Delta_{m-1}$ and $\Delta_m$ are approximately equal. When $\Delta_{m-1}$ and $\Delta_m$ are approximately equal, it is possible to simplify the design of the electronic circuit (integrated circuit, divided pulse generation control circuit) which controls generation of pulse beams, and to maintain the excellent jitter characteristic at the same time.

The above operations are performed when m is not less than 3. Value of $\Delta_1$ and $\Delta_{mm}$ are generally within a range from 0.3 to 0.6. A value of each of $\Delta_{m-1}$ and $\Delta_m$ may be within a range from 0 to 0.6 according to how $\Delta_{mm}$ is divided. $\Delta_1$, $\Delta_{m-1}$, $\Delta_m$ and $\Delta_{mm}$ are not always 0.5, as stated above. Preferably, values of $\Delta_1$, $\Delta_{m-1}$ and $\Delta_m$ are smaller to some extent than 0.5.

Particularly, it is preferable that $\alpha_1'=\alpha_1$ and $\beta_m'=\beta_m$, and $\alpha_i$ and $\alpha_i'$ are $\alpha c$ and constant irrespective of i within a range of i from 2 to m−1. It is also preferable that $\alpha_m$ and $\alpha_m'$ are constant values irrespective of m. Further, it is preferable that $\alpha_1$ ($\alpha_1'$) is 0.7 to 1.4, $\alpha c$ is 0.7 to 1.2, and $\alpha_m$ is 0.7 to 1.2.

When m is not less than 3, it is preferable that $\alpha_1$ ($=\alpha_1'$), $\alpha c$, $\beta_m$ ($=\beta_m'$), $\beta_1$, $\Delta_1$, $\beta_{m-1}$, $\Delta_{m-1}$ and $\Delta_m$ are constant irrespective of m.

Here, an example of setting of $\Delta c$ will be described. First, $\alpha c=\alpha_i$ (where i is 2 to m−1) is 1, then finely adjusted within a range of ±0.2. The same values as $\alpha c$ is employed for $\alpha_1$ and $\alpha_m$, then $\alpha_1$ and $\alpha_m$ are finely adjusted within a range larger than ac by up to about 0.3.

As above, a recording pulse train 303 denoted by a broken line in FIG. 2(b) is obtained for the even-number-length mark, whereas a recording pulse train 307 denoted by a broken line in FIG. 2(c) is obtained for the odd-number-length mark.

When m=1 (n=3), radiation of a recording beam in a pair of sections; a recording power radiation section $\alpha_1'T$ and a bias power radiation section $\beta_1'T$, is performed. In this case, it is preferable that $\alpha_1'$ is larger by about 0.1 to 1.5 than $\alpha_1'$ at the time that m is not less than 2, whereas $\beta_1'$ is smaller than $\beta_1'$ at the time that m is not less than 2, and equal to $\beta_m$ and $\beta_m'$ or large than them.

Figures 3A, 3B, 3C:
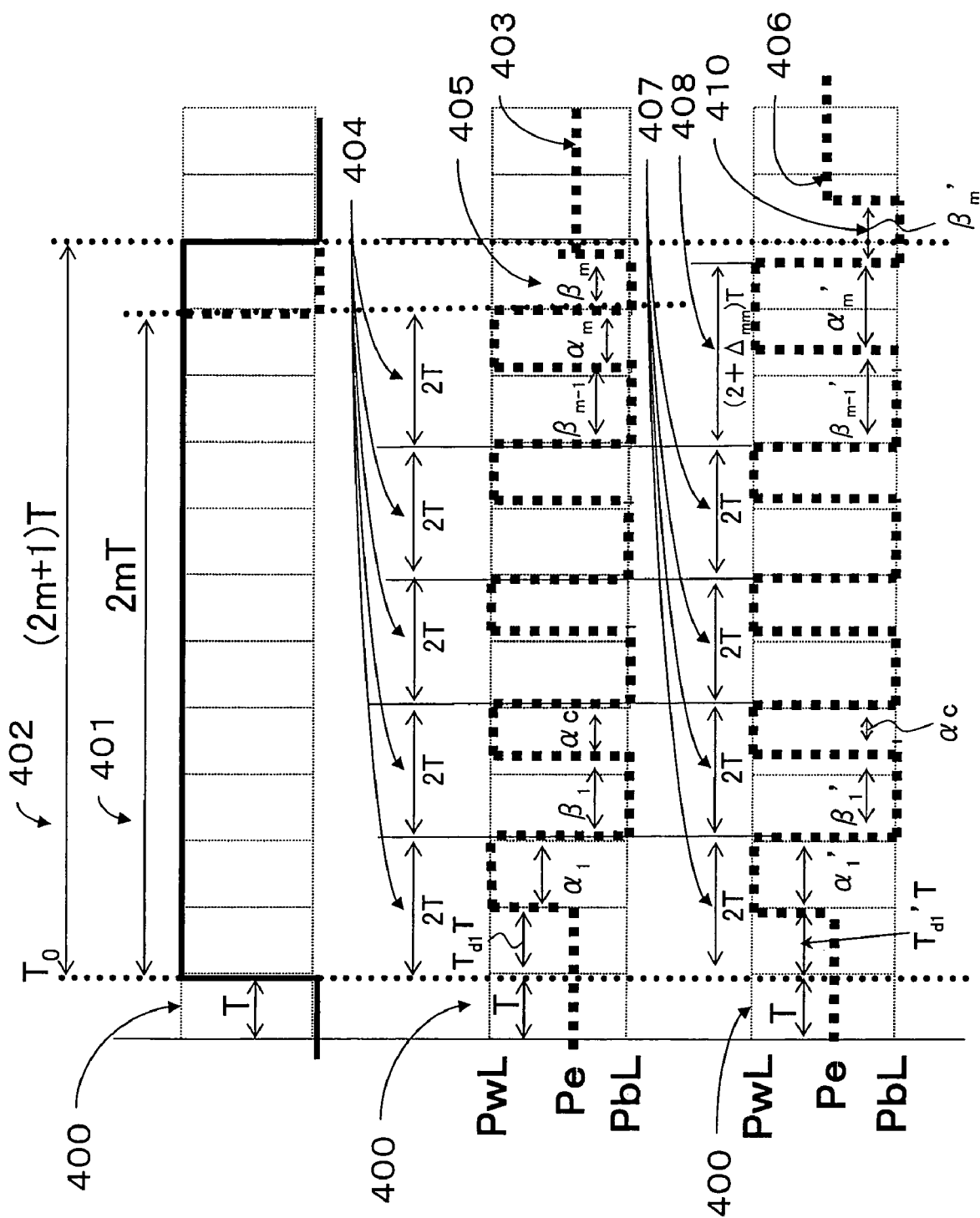
FIGS. 3(a) through 3(c) are diagrams for illustrating another example of the 2T divided pulse strategy used when writing is performed at a linear velocity lower than the predetermined recording linear velocity in the optical recording method according to the embodiment of this invention.

FIGS. 3(a) through 3(c) show another preferable example of a relationship among recording pulses in the recording strategy with the 2 T divided pulse used in this invention. FIGS. 3(a) through 3(c) show a pulse dividing method used when an nT recording mark of n=2 m or 2 m+1 is formed. Incidentally, time lengths of recording pulses and cooling pulses forming a mark length 2 mT in FIG. 3(b) should be originally represented as $\alpha_1 T$, $\beta_1 T$, $\alpha c T$, ..., $\alpha_m T$ and $\beta_m T$, but, in FIG. 3(b), simply denoted as $\alpha_1$, $\beta_1$, $\alpha c$, ..., $\alpha_m$ and $\beta_m$ and representation of the clock period T is omitted in order to provide an easy-to-see drawing. This is the same in FIG. 3(c).

As shown in FIG. 3(b), consideration is given to whether the value of n in an nT mark is an odd number or an even number. Compensation of a difference 1 T in mark length between an odd-number-length mark and an even-number-length mark having the same dividing number m is distributed to the second recording pulse period $(\beta_{m-1}+\alpha_m)T$ from the last and the last off-pulse $\beta_m T$, and assigned to them. Namely, compensation of a mark length 1 T is made by adjusting off-pulse lengths $\beta_{m-1}T$ and $\beta_m T$, and the last recording pulse section $\alpha_m T$.

In FIG. 3(a), reference numeral 400 denotes a reference clock.

FIG. 3(a) shows a pulse waveform corresponding to a recording mark with a length of nT=2 mT or nT=(2 m+1)T, wherein reference numeral 401 corresponds to a length of a recording mark with a length of 2 mT, and reference numeral 402 corresponds to a recording mark with a length of (2 m+1)T. FIG. 3(a) shows an example where m=5.

Reference numeral 403 in FIG. 3(b) designates a waveform of divided recording pulses in the case of n=2 m (=10).

Reference numeral 406 in FIG. 3(c) designates a waveform of divided recording pulses in the case of n=2 m+1 (=11).

A value obtained by multiplying $T_{d1}$ by T is a delay time of $\alpha_1 T$ and $\alpha_1'T$ from the front edge $T_0$ of nT marks, which is generally constant independent of n. The delay time is positive when the recording pulse delays from the front edge of a recording mark with a length of nT.

Generally, $(T_{d1}+\alpha_1)T=(T_{d1}+\alpha_1')T=2$ T is set for the purpose of easy synchronism of a recording pulse generating circuit (divided pulse generation control circuit). However, each of $(T_{d1}+\alpha_1)T$ and $(T_{d1}+\alpha_1')T$ may be finely adjusted within a range of about ±0.5 T. Particularly, it is preferable to finely adjust $T_{d1}T$ in 3 T, 4 T and 5 T marks. The recording power level in a recording pulse section $\alpha_i T$ (where i is 1 to m) is PwL and constant. The bias power level in an off-pulse section $\beta_i T$ (where i is 1 to m) is PbL and constant. The power of an applied beam in a section between a recording mark and a recording mark, that is, a section excluding $\alpha_i T$ (where i is 1 to m) and $\beta_i T$ (where i is 1 to m), is an erasing power Pe and constant.

When n is an even number, in the section 404, $(\beta_{i-1}+\alpha_i)T=2$ T (where i is 2 to m) and is constant. Here, although $(\beta_{i-1}+\alpha_i)$ T is 2 T and constant, an error of about ±0.2 T is allowed, as state above. However, only $(\beta_1+\alpha_2)T$ and $(\beta_{m-1}+\alpha_m)T$ can be finely adjusted within a range of ±0.3 T.

When n is an odd number, in the section 407 in FIG. 3(c), $(\beta_{i-1}'+\alpha_i')T=2$ T (where i is 2 to m−1) and is constant. However, $(\beta_1'+\alpha_2')T$ is equal to $(\beta_1+\alpha_2)T$. Although $(\beta_{i-1}'+\alpha_i')T$ is 2 T and constant, an error of about ±0.2 T is allowed, as stated above.

In order to record two kinds of mark lengths of n=2 m and 2 m+1 with the same dividing number, a section $(\beta_{m-1}+\alpha_m)T$ is increased or decreased by about 1 T to adjust the lengths. Note that this value is not always accurately 1 T due to an effect of thermal interference and the like, but is within a range from approximately 0.5 T to 1.2 T. Namely, in the above pulse division strategy, it is preferable that $\beta_{m-1} \neq \beta_{m-1}'$ and $\alpha_m \neq \alpha_m'$ are satisfied.

$\beta_m$ may be approximately equal to $\beta_m'$ within a range from 0 to 2. In order to correct an influence on the jitter of the rear end of the mark, each of $\beta_m$ and $\beta_m'$ may be finely adjusted.

In FIG. 3(c), recording of a difference 1 T in mark length between an even-number-length nT=10 T and an odd-number-length nT=11 T is performed in the following operation 3.

Operation 3: As seen in a section 408 in FIG. 3(c), $\Delta_{mm}T$ is added to a section $(\beta_{m-1}+\alpha_m)T$ to yield $(\beta_{m-1}'+\alpha_m')T$. Here, $\Delta_{mm}=\Delta_{m-1}+\Delta_m$, $\Delta_{mm}$ is divided into $\Delta_{m-1}$ and $\Delta_m$, $\Delta_{m-1}$ is added to $\beta_{m-1}$, and $\Delta_m$ is added to $\alpha_m$. In order to correct the effect on jitter in the rear edge of the mark, $\Delta_m'$ is added to $\beta_m$ to yield $\beta_m'$.

The above operation is performed on m not less than 3. Generally, $\Delta_{mm}$ is a value from 0.5 to 1.2. A value of each of $\Delta_{m-1}$ and $\Delta_m$ can be 0 to 0.9 according to how $\Delta_{mm}$ is divided.

Either one of $\Delta_{m-1}$ and $\Delta_m$ may be zero. Preferably, $\Delta_m$ is larger than 0, that is, $\alpha_m \neq \alpha_m'$. By making $\Delta_m$ larger than 0, the shape of the rear edge of a recording mark whose n is an odd number with the same dividing number m becomes stable and the jitter characteristic is noticeably improved. $\Delta_m$ is generally not less than 0.1, on the other hand, generally not larger than 0.9, preferably not larger than 0.5. The value of $\Delta_m$ is suitably set according to the recording linear velocity. Since securing the melting time becomes more important as the recording linear velocity increases, it is preferable to increase $\Delta_m$ as the recording linear velocity increases.

$\Delta_{m-1}$ is generally not less than 0.1, preferably not less than 0.3, on the other hand, generally not larger than 0.9, and preferably not larger than 0.8. The value of $\Delta_{m-1}$ is suitably set according to the recording linear velocity. Since securing the cooling time becomes more important as the recording linear velocity decreases, it is preferable to increase $\Delta_{m-1}$ as the recording linear velocity decreases.

More preferably, a value of $\Delta_{m-1}$ is approximately equal to a value of $\Delta_m$. By making $\Delta_{m-1}$ approximately equal to $\Delta_m$, it becomes possible to simplify the design of the divided pulse generation control circuit (integrated circuit) while keeping the jitter characteristic excellent. The value of $\Delta_m'$ is generally 0 to 1, more preferably 0 to 0.6. Particularly, it is preferable that $\Delta_m'$ is large when the recording linear velocity is low. When the recording linear velocity is high, it is preferable that $\Delta_m'=0$. If $\Delta_m'=0$ at all linear velocities, it becomes possible to simplify the design of the pulse generation control circuit.

Particularly, when m is not less than 3, it is preferable that $\alpha_1'=\alpha_1$ and $\beta_1'=\beta_1$, and $\alpha_1$ and $\alpha_1'$ are $\alpha c$ and constant independent of i when i is 2 to m−1. The value of $\alpha_1$ $(=\alpha_1')$ is generally within a range from 0.3 to 1.7, and preferably within a range from 0.3 to 1.0. It is preferable that values of $\beta_1$, $\alpha c$, $\beta_{m-1}$ and $\alpha_m$ are generally within a range from 0.3 to 1.7. More preferably, $\alpha_1$ $(-\alpha_1')$, $\beta_1$, $\alpha c$ and $\alpha_m$ are within a range from 0.3 to 1.6. On the other hand, the value of $\beta_{m-1}$ is more preferably not less than 0.7, still more preferably not less than 1, on the other hand, more preferably not larger than 1.6.

When m is not less than 3, it is preferable that $\alpha_1$ $(=\alpha_1')$, $\beta_1$, $\alpha c$, $\beta_{m-1}$, $\Delta_{m-1}$, $\alpha_m$, $\Delta_m$, $\beta_m$ and $\Delta_m'$ are constant independent of m.

Here, setting of a c will be described. First, it is preferable that $\alpha c=\alpha_1$ (where i is 2 to m) and is 1, then finely adjusted within a range of ±0.2. The same value as ac is employed as values of $\alpha_1$ and $\alpha_m$, and $\alpha_1$ and $\alpha_m$ are finely adjusted within a range larger than $\alpha c$ by up to about 0.3.

Initial values of $\Delta_m$ and $\Delta_{m-1}$ are about 0.4, and finely adjusted so as to obtain a predetermined mark length.

$\beta_m'$ in the section 410 is first equal to $\beta_m$ in the section 405, then finely adjusted.

As above, a recording pulse train 403 denoted by a broken line in FIG. 3(b) is obtained for a even-number-length mark, whereas a recording pulse train 406 denoted by a broken line in FIG. 3(c) is obtained for an odd-number-length mark.

When m=1 (n=3), the recording beam is irradiated in a pair of sections, a recording power radiation section $\alpha_i'T$ and a bias power radiation section $\beta_1'T$. In this case, it is preferable that $\alpha_1'$ is larger by about 0.1 to 1.5 than $\alpha_1'$ obtained when m is not less than 2.

[2C] Items Preferable to be Commonly Used in All Recording Linear Velocities

Now, description will be made of items preferable to be commonly used in "a recording method at a recording velocity (linear velocity) higher than a predetermined recording velocity (predetermined recording linear velocity; for example, the rewritable maximum recording linear velocity)" in the above "2A," and "a recording method (pulse dividing method) at a linear velocity (a rewritable linear velocity region; recording velocity) not higher than a predetermined recording linear velocity (predetermined recording velocity)" in the above "2B."

In order to simplify the divided pulse generation control circuit, it is preferable that the recording power PwL at the time of recording using divided recording pulses is equal to the recording power PwH at the time of recording using a block pulse.

It is also preferable that the bias power PbL irradiated during a cooling pulse period in divided recording pulses is equal to the bias power PbH used when recording is performed using a block pulse.

[2D] Recording/Retrieving Apparatus Used in This Invention

According to this invention, a divided pulse generation control circuit is designed and integrated in a known recording/retrieving apparatus (drive), whereby a recording/retrieving apparatus is obtained in order to perform the above recording method. A disk-shaped rewritable optical recording medium (for example, a DVD in a disk-shape having a diameter of about 12 cm) is mounted on the recording/retrieving apparatus (drive), and the rewritable optical recording medium is rotated by driving a spindle motor or the like. Further, a recording beam is applied at a desired radial position at which recording is performed on the rewritable optical recording medium according to "a rewritable recording mode," "a write-once recording mode" and "a DC erasing mode" described below to form recording marks in the amorphous state with various time lengths in the phase-change recording layer, whereby recording/erasing of information is performed.

The recording/retrieving apparatus for executing the recording method used in this invention may be added thereto not only the recording function but also the retrieving function, of course, like a drive mounted on a commercially available personal computer or DVD recording/retrieving apparatus.

Details of the recording/retrieving apparatus used in this invention are as follows.

Namely, a recording/retrieving apparatus, in which a disk-shaped rewritable optical recording medium is mounted, and in a state of rotating the rewritable optical recording medium a recording beam is applied onto the rewritable optical recording medium for recording information; where the rewritable optical recording medium having a phase-change recording layer in which a crystalline state of the phase-change recording layer is used as an unrecorded/erased state and recording marks in the amorphous state with various time lengths nT (where T is a reference clock period and n is an integer not less than 2) are formed in the unrecorded/erased state.

The recording/retrieving apparatus has three recording beam radiation modes; a rewritable recording mode, a write-once recording mode and a DC erasing mode; wherein (A-1) in the rewritable recording mode, recording on the rewritable optical recording medium is performed;

rotating the rewritable optical recording medium so that a linear velocity at a radial position of the rewritable optical recording medium for recording information therein is within a range of recording velocity at which the rewritable optical recording medium can be rewritten;

a plurality of recording marks with the time length of nT are formed, dividing the time length nT into $\eta_1 T, \alpha_1 T, \beta_1 T, \alpha_2 T, \beta_2 T, \ldots, \alpha_i T, \beta_i T, \ldots, \alpha_m T, \beta_m T$ and $\eta_2 T$ (where m is a pulse dividing number, i is an integer not less than 1 and not larger than m, $\Sigma_i(\alpha_i+\beta i)+\eta_1+\eta_2=n$, $\alpha_i$ ($1 \leq i \leq m$) is a real number larger than 0, $\beta_i$ ($1 \leq i \leq m-1$) is a real number larger than 0, $\beta_m$ is a real number not less than 0, and $\eta_1$ and $\eta_2$ are real numbers not less than −2 and not larger than 2) in this order, where the pulse dividing number m for the time length of at least one recording mark is not less than 2, and the every time length of recording marks satisfies $n/m \geq 1.25$, applying a recording beam having a recording power $Pw_i$ ($1 \leq i \leq m$) during a time period of $\alpha_i T$;

applying a recording beam having a bias power $Pb_i$ ($1 \leq i \leq m$, $Pb_i < Pw_i$, $Pb_i < Pw_{i+1}$) during a time period of $\beta_i T$;

applying a recording beam having an erasing power Pe (Pe is a value not less than any values of m $Pb_i$'s where $1 \leq i \leq m$, and is a value smaller than any values of m $Pw_i$'s where ($1 \leq i \leq m$)) on the spaces between the plural recording marks, (A-2) in the write-once recording mode, recording on the rewritable optical recording medium is performed;

rotating the rewritable optical recording medium so that the linear velocity at a radial position of the rewritable optical recording medium for recording information therein is higher than the recording velocity range in which recorded information in the rewritable optical recording medium can be rewritten;

forming a recording mark with a time length of nT with one block pulse in which a recording beam having a recording power PwH and a recording beam having a bias power PbH can be applied.

(A-3) in the DC erasing mode, recorded information in the rewritable optical recording medium is erased;

rotating the rewritable optical recording medium so that the linear velocity at a radial position of the rewritable optical recording medium in which recorded information is to be erased is within the range of recording velocity in which the rewritable optical recording medium can be rewritten, applying a recording beam having an erasing power $P_{DC}$; and (A-4) when executing the write-once recording mode after executing the rewritable recording mode, or when again executing the write-once recording mode after executing the write-once recording mode, the DC erasing mode is executed to erase recorded information in the rewritable optical recording medium.

The recording/retrieving apparatus of this invention has three recording modes; the rewritable mode, the write-once recording mode and the DC erasing mode. In the write-once recording mode, information is recorded in a rewritable optical recording medium in the recoding method using a block pulse described in the above [2A]. In the rewritable recording mode, information is recorded in the rewritable optical recording medium in the recording method using divided pulses described in the above [2B]

As described above in [2A] and [2B], it is preferable that the bias powers $Pb_i$ and PbH are smaller than the erasing power Pe.

As described above in [2B], it is preferable that, in the rewritable recording mode, the recording power $Pw_i$ is a constant value PwL within $1 \leq i \leq m$, and the bias power $Pb_i$ is a constant value PbL within $1 \leq i \leq m$.

As described above in [2C], it is preferable that the recording power PwL in the rewritable recording mode is equal to the recording power PwH in the write-once recording mode.

Similarly, as state above in [2C], it is preferable that the bias power PbL in the rewritable recording mode is equal to the bias power PbH in the write-once recording mode.

Further, as stated above in [2B] and [2C], it is preferable that the bias power PbL in the rewritable recording mode and the bias power PbH in the write-once recording mode are both smaller than the erasing power Pe.

Since the phase-change recording layer of a rewritable optical recording medium such as a rewritable DVD is in the crystalline state (erased state) as the initial state when shipped or put on sale, for example, the rewritable optical recording medium can be used in this state as a write-once medium. For this reason, recording is executed in the write-once recording mode after the rewritable optical recording medium in the initial state is inserted into the recording/retrieving apparatus of this invention, whereby recording at a recording velocity higher than the rewritable maximum recording linear velocity is possible.

When the write-once recording mode is again executed, with information already written in the rewritable optical recording layer by executing the above write-once recording mode or the rewritable recording mode (when with amorphous recording marks already formed in the phase-change recording layer), the following operation is executed. A DC beam is applied before writing in the write-once recording mode is performed, thereby to restore the phase-change recording layer to the crystalline state (erased state) (DC erasing mode is executed). Practically, the DC erasing mode is executed by applying a recording beam of an erasing power $P_{DC}$ at a recording linear velocity at which information written in the rewritable optical recording medium can be rewritten.

It is preferable in the viewpoint of simplification of the divided pulse generation control circuit that the erasing power $P_{DC}$ in the DC erasing mode is equal to the erasing power Pe.

Known apparatus may be used as the laser exposure device, the driving unit for the rewritable optical recording medium and so forth in the recording/retrieving apparatus of this invention.

[3] Optical Recording Medium Having Preferable Phase-Change Recording Layer Used in This Invention Hereinafter, description will be made of some practical modes of an optical recording medium used in this invention by way of rewritable DVD.

The recording method of this invention is applied to an optical recording medium having a phase-change recording layer, in which information is recorded using the crystalline state and the amorphous state, and the information can be rewritten.

As a practical example of an optical recording medium having the phase-change recording layer, there is an optical recording medium (optical recording medium of a substrate incident type), which has a layer structure in which the first protective layer (lower protective layer), a recording layer (phase-change recording layer), the second protective layer (upper protective layer), a reflective layer and a protective coating layer are formed in this order on a substrate, and a laser beam is applied through the substrate to record and retrieve signals.

As another practical example of the optical recording medium having a recording layer of the phase-change type, there is an optical recording medium (optical recording medium of a surface incident type) having a layer structure, in which a reflective layer, the first protective layer (lower protective layer), the recording layer (phase-change recording layer), the second protective layer (upper protective layer) and the protective coating layer are formed in this order on a substrate, and a laser beam is applied through the upper protective layer to record and retrieve signals. Since signals are recorded and retrieved by applying a laser beam from the upper protective layer's side, not through the substrate, in the optical recording medium of the surface incident type, it is possible to decrease a distance between the recording layer and the optical head to several hundreds micron or less. Thus, use of an objective lens having a numerical aperture of not less than 0.7 can improve the recording density of the medium.

Note that the layer structures of the optical recording medium of the substrate incident type and the optical recording medium of the surface incident type are mere examples. For example, a interface layer may be provided between the protective layer and the reflective layer in both the optical recording medium of the substrate incident type and the optical recording medium of the surface incident type. In the optical recording medium of the surface incident type, a subbing coating layer may be provided between the substrate and the reflective layer.

A rewritable optical recording medium of the phase-change with which a high data transfer rate is accomplished is preferable in this invention. Such optical recording medium can be realized by using a recording material having a high crystallization speed for the recording layer, in general.

Hereinafter, description will be made of each of the recording layer, the substrate, the protective layer, the reflective layer and the protective coat layer.

[3A] Recording Layer

As the recording layer, a compound a system of GeSbTe, InSbTe, AgSbTe, AgInSbTe and so forth is selected as a material that can be repetitively recorded. Among them, frequently selected are a composition containing a pseudo-binary alloy of $Sb_2Te_3$ and Gete, more concretely, $\{(Sb_2Te_3)_{1-\alpha}(GeTe)_\alpha\}_{1-\beta}Sb_\beta$ composition (provided, $0.2 \leq \alpha \leq 0.9$, $0 \leq \beta \leq 0.1$), and a composition containing Sb as the main component, containing not less than 50 atomic-percent Sb.

In the optical recording medium to which this invention is applied, it is more preferable to use a composition containing Sb as the main component for the recording layer to increase the crystallization speed. In this invention, "containing Sb as the main component" signifies that the content of Sb is not less than 50 atomic-percent in the whole recording layer. A reason why Sb is used as the main component is that amorphous Sb can be crystallized at very high speed so that an amorphous mark can be crystallized within a short period of time. Accordingly, a recording mark in the amorphous state can be readily erased. In this viewpoint, it is preferable that the content of Sb is not less than 60 atomic-percent, and more preferably not less than 70 atomic-percent. On the other hand, it is more preferable to use Sb with an additional element for prompting formation of an amorphous area and increasing the archival stability of the amorphous state, rather than use Sb alone. In order to accelerate the formation of an amorphous area and increase the archival stability of the amorphous state of the recording layer, the content of the additional element is generally not less than 1 atomic-percent, preferably not less than 5 atomic-percent, more preferably not less than 10 atomic-percent, on the other hand, generally not larger than 30 atomic-percent.

The above additional element prompting the formation of an amorphous area and increasing the archival stability of the amorphous state has another effect of increasing the crystallization temperature. As such additive elements, Ge, Te, In, Ga, Sn, Pb, Si, Ag, Cu, Au, rare earth elements, Ta, Nb, V, Hf, Zr, W, Mo, Cu, Cr, Co, nitrogen, oxygen, Se, etc. can be used. In the standpoint of prompting the formation of an amorphous area, improving the archival stability of the amorphous state and increasing the crystallization temperature, among the above additive elements, it is preferable to use at least one selected from a group of Ge, Te, In, Ga and Sn. Particularly preferable, Ge and/or Te is used, or at least one of In, Ga and Sn is used.

As stated above, it is particularly preferable to use Sb in combination with Ge and/or Te as the material of the recording layer in the optical recording medium to which this invention is applied. When adding Ge and/or Te to Sb, it is preferable that the contents of Ge and/or Te are not less than 1 atomic-percent and not larger than 30 atomic-percent in the recording layer. Namely, it is preferable that the content of each of Ge and Te is not less than 1 atomic-percent and not larger than 30 atomic-percent. However, since the content of Sb is not less than 50 atomic-percent when the main component of the recording layer is Sb, the sum of quantities of Ge and Te is smaller than 50 atomic-percent when Ge and Te are contained together with Sb in the recording layer.

The content of Ge or Te in the recording layer is preferably not less than 3 atomic-percent, more preferably not less than 5 atomic-percent. Within this range, the effect of stabilizing the amorphous mark can be sufficiently exhibited. The content of each of Ge and Te in the recording layer is preferably not larger than 20 atomic-percent, more preferably not larger than 15 atomic-percent. Within this range, a tendency that the amorphous area becomes too much stable, and, on the other hand, the crystallization slows down can be suppressed well, and noise due to light scattering in the grain boundary can be suppressed.

The composition containing Sb as the main component can be classified into two types according to the quantity of Te contained in the recording layer. One is a composition containing not less than 10 atomic-percent Te, and the other is a composition (including a case where Te is not contained) containing less than 10 atomic-percent Te.

One of these is that the recording layer material is within a range of compositions, the main component of which is an alloy containing approximately not less than 10 atomic-percent Te, and containing more Sb than $Sb_{70}Te_{30}$ eutectic composition. Hereinafter, this recording layer material will be referred to as SbTe eutectic system. Here, Sb/Te is preferably not less than 3, more preferably not less than 4.

The following is another composition containing Sb as the main component, which can be classified according the quantity of Te contained in the recording layer. Namely, a composition of the recording layer contains Sb as the main component, together with less than 10 atomic-percent Te, and Ge as the essential component. As a practical example of the above composition of the recording layer, preferable is an alloy containing an eutectic alloy of a composition neibouring $Sb_{90}Ge_{10}$, and less than 10 atomic-percent Te (in this specification, this alloy will be referred to as SbGe eutectic system).

The composition in which the quantity of added Te is less than 10 atomic-percent comes to have a property of not the SbTe eutectic system but the SbGe eutectic system. In the alloy of this SbGe eutectic system, the crystalline state easily becomes single phase so that the alloy produces low noise even if the content of Ge is as high as about 10 atomic-percent because the size of a crystal grain in the polycrystalline state after the initial crystallization is relatively minute. In the alloy in the SbGe eutectic system, Te is not an essential element, since Te is supplementary added.

In the SbGe eutectic system alloy, it is possible to increase the crystallization speed by relatively increasing the Sb/Ge ratio, and re-crystallize an amorphous mark by re-crystallization.

When recording is performed by forming amorphous marks on the recording layer, which is in the crystalline state (the unrecorded/erased state), using a composition containing Sb as the main component in the recording layer, it is very important to provide a good cooling efficiency. A reason of this is as follows.

In the recording layer containing Sb in the SbTe eutectic system, the SbGe eutectic system or the like as the main component, Sb is added in excess of neighborhood of the $Sb_{70}Te_{30}$ eutectic point or the $Sb_{90}Ge_{10}$ eutectic point, not the crystalline nucleation rate but the crystalline growth rate is increased to increase the crystallization speed in order to cope with high-velocity recording. For this, it is preferable in these recording layers that the cooling rate of the recording layer is increased to suppress a change in amorphous mark due to re-crystallization (that is, the size of the amorphous mark becomes smaller than a desired size). Accordingly, it is important to rapidly cool the recording layer after the recording layer is melted in order to certainly form an amorphous mark. For this, increasing the cooling efficiency of the recording layer is very important. For this reason, it is preferable to use Ag or an Ag alloy having excellent heat dissipation characteristics in the reflective layer in the above recording layer composition. Use of the optical recording method of this invention to an optical recording medium having a recording layer in which the cooling efficiency at the time of recording is required to be increased is meaningful.

In an optical recording medium to which the embodiment of this invention is applied, it is particularly preferable that the recording layer using a composition containing Sb in the SbTe eutectic system or the SbGe eutectic system as the main component further contains at least one of In, Ga and Sn, and that the content of In, Ga or Sn in the recording layer is not less than 1 atomic-percent and not larger than 30 atomic-percent.

Hereinafter, a practical example of a composition containing Sb as the main component will be further described.

As the composition containing Sb as the main component, preferable is a composition in the SbTe eutectic system containing, as the main component, $(Sb_xTe_{1-x})_{1-y}M_y$ (where $0.6 \leq x \leq 0.9$, $0 \leq y \leq 0.3$, M is one selected among Ge, Ag, In, Ga, Zn, Sn, Si, Cu, Au, Pd, Pt, Pb, Cr, Co, O, S, Se, V, Nb and Ta) alloy. In the above formulae of the compositions, the component is represented by using a ratio of the number of atoms. Accordingly, x=0.6 represents 60 atomic-percent, for example.

In the above $(Sb_xTe_{1-x})_{1-y}M_y$ composition, it is particularly preferable that Ge, Ga, Ag or In is solely used or simultaneously used as M in the standpoint of the recording characteristics such as over-writing characteristic and the like.

In the above $(Sb_xTe_{1-x})_{1-y}M_y$ composition, x is generally not less than 0.6, preferably not less than 0.7, more preferably not less than 0.75, on the other hand, generally not larger than 0.9. y is generally not less than 0, preferably not less than 0.01, more preferably not less than 0.03, on the other hand, generally not larger than 0.3, preferably not larger than 0.2, and more preferably not larger than 0.1 If $x_1 y$ are within the above ranges, it is possible to obtain a recording layer which can cope with high-velocity recording.

Now, a composition using Ge as M in the above $(Sb_xTe_{1-x})_{1-y}M_y$ composition will be further described. As this composition expressed by $Ge_y(Sb_xTe_{1-x})_{1-y}$ (where $0.01 \leq y \leq 0.06$, $0.82 \leq x \leq 0.9$), it is preferable to use a composition, which contains an $Sb_{70}Te_{30}$ alloy containing largely excessive Sb as the basic body on the basis of the $Sb_{70}Te_{30}$ eutectic composition, along with Ge. The quantity of Ge is preferably not less than 0.01 as a value of y in $Ge_y(Sb_xTe_{1-x})_{1-y}$, and particularly preferably not less than 0.02. On the other hand, in such SbTe eutectic composition containing a high content of Sb, an intermetalic compound in the GeTe or GeSbTe system precipitates when the quantity of Ge is too much, and an SbGe alloy can also precipitate. Thus, it is presumed that crystal grains having different optical constants are mixed together in the recording layer, which may cause an increase in noise in the recording layer and an increase in jitter. When Ge is added too much, the effect of archival stability of the amorphous mark is saturated. For this reason, the quantity of Ge is generally not larger than 0.06 as a value of y in $Ge_y(Sb_xTe_{1-x})_{1-y}$, preferably not larger than 0.05, and more preferably not larger than 0.04.

It is particularly preferable that the compound in the above GeSbTe eutectic system preferably further contains In, Ga and Sn. Namely, it is particularly preferable to use a compound expressed by $M1_zGe_y(Sb_xTe_{1-x})_{1-y-z}$ (where $0.01 \leq z \leq 0.4$, $0.01 \leq y \leq 0.06$, $0.82 \leq x \leq 0.9$, M1 represents one element selected from the group consisting of In, Ga and Sn). The characteristics are further improved by adding at least one element in a group of elements, In, Ga and Sn, as the above M1. The elements, In, Ga and Sn, can increase the optical contrast between the crystalline state and the amorphous state, and decrease the jitter. z representing the content of M1 is generally not less than 0.01, preferably not less than 0.02, more preferably not less than 0.05, on the other hand, generally not larger than 0.4, preferably not larger than 0.3, more preferably not larger than 0.2, and particularly preferably not larger than 0.1. Within this range, the effect of improving the above characteristics can be well exhibited.

Other than In, Ga and Sn, nitrogen, oxygen and sulfur are elements that can be contained in the composition in the above GeSbTe eutectic system. These elements have an effect that segregation during repetitive overwriting can be prevented, and the optical characteristics can be finely adjusted. The content of nitrogen, oxygen or sulfur is preferably not larger than 5 atomic-percent of the total quantity of Sb, Te and Ge.

Sn, Cu, Zr, Hf, V, Nb, Ta, Cr and Co can be contained in the composition in the above GeSbTe eutectic system. Addition of quite small amounts of these elements can increase the crystallization temperature without decreasing the crystalline growth rate, and provide an effect of improvement of the archival stability. However, when the quantities of these elements are too much, segregation with time of a specific substance and segregation due to repetitive overwriting tend to occur, thus the quantity of these elements to be added is preferably not larger than 5 atomic-percent, and particularly preferably not larger than 3 atomic-percent. When segregation occurs, the stability of the amorphous state that the recording layer has in the early stage, the re-crystallization speed, etc. are changed, which may cause degradation of the overwrite characteristic.

On the other hand, as a composition in the SbGe eutectic system that is a composition containing Sb as the main component, there is a composition containing, as the main component, TeGeSb system in which Te is added to the SbGe eutectic system, and a composition containing, as the main component, a ternary alloy in InGeSb system, GaGeSb system or SnGeSb system in which In, Ga or Sn is added to the SbGe eutectic system. By adding Te, In, Ge or Sn to an alloy in the SbGe eutectic system, an effect of increasing the difference in optical characteristics between the crystalline state and the amorphous state becomes noticeable. It is particularly preferable to add Sn.

As a preferable composition of such an alloy in the SbGe eutectic system, there is $Te_\gamma M2_\delta(Ge_\epsilon Sb_{1-\epsilon})_{1-\delta-\gamma}$ (where $0.01 \leq \epsilon \leq 0.3$, $0 \leq \delta \leq 0.3$, $0 \leq \gamma < 0.1$, $2 \leq \delta/\gamma$, $0 < \delta+\gamma \leq 0.4$, and M2 is one selected from a group consisting of In, Ga and Sn). By adding In, Ga or Sn to the SbGe eutectic system alloy, the effect of increasing the difference in optical characteristics between the crystalline state and the amorphous state becomes noticeable.

Use of In or Ga as the element M2 can improve jitter at the time of high-velocity recording, and can increase the optical contrast. δ representing the content of In and/or Ga is generally not less than 0, preferably not less than 0.01, and more preferably not less than 0.05. When the content of In or Ga is excessive, there is possibility that another crystalline phase in In—Sb system or Ga—Sb system having very low reflectance is formed, other than a crystalline phase used as the erased state. Accordingly, δ is generally not larger than 0.3, and preferably not larger than 0.2. Incidentally, when In is compared with Ga, In can realize less jitter than Ga. For this, it is preferable that the above M2 is In.

On the other hand, use of Sn as the element M2 can improve jitter at the time of high-velocity recording, and increase the optical contrast (difference in reflectance between the crystalline state and the amorphous state). For this, δ representing the content of Sn is generally not less than 0, preferably not less than 0.01, and more preferably not less than 0.05. When Sn is too much, there is possibility that the amorphous state immediate after recording changes to another amorphous state with a low reflectance. When the optical recording medium is stored for a long time, there is a tendency that the stabilized amorphous phase segregates and the erasing performance degrades. Accordingly, δ is generally not larger than 0.3, and preferably not larger than 0.2.

Use of a plurality of elements among In, Ga and Sn as the element M2 is possible. However, it is particularly preferable that In and Sn are contained. When In and Sn are contained, the sum of contents of these elements is generally not less than 1 atomic-percent, preferably not less than 5 atomic-percent, generally not larger than 40 atomic-percent, preferably not larger than 30 atomic-percent, and more preferably not larger than 25 atomic-percent.

In the composition in the above TeM2GeSb system, it is possible to improve the change with time in erasability ratio at the time of super-high-velocity recording by containing Te. For this, γ representing the content of Te is generally not less than 0, preferably not less than 0.01, and particularly preferably not less than 0.05. When Te is too much, there is possibility that noise increases, thus γ is generally smaller than 0.1.

When Te and the element M2 are contained in the composition in the above TeM2GeSb system, it is effective to control the sum of these contents. Accordingly, δ+γ representing the contents of Te and the element M2 is generally larger than 0, preferably not less than 0.01, and more preferably not less than 0.05. With δ+γ in the above range, the effect given by containing Te and the element M2 simultaneously is well exhibited. In order to exhibit the effect given by containing a GeSb system eutectic alloy as the main component, δ+γ is generally not larger than 0.4, preferably not larger than 0.35, and more preferably not larger than 0.3. On the other hand, δ/γ representing the ratio of the number of atoms of the element M2 to Te is preferably not less than 2. Since the optical contrast tends to decrease when Te is contained, it is preferable that the content of the element M2 is slightly larger (that is, δ is slightly larger) when Te is contained.

As elements that can be added to the above TeM2GeSb system, there are Au, Ag, Pd, Pt, Si, Pb, Bi, Ta, Nb, V, Mo, rare earth elements, N, O, etc., which are used for fine adjustment of the optical characteristics and the crystallization speed, but the quantity thereof is up to about 10 atomic-percent.

One of the most preferable compositions is a composition containing an alloy system of $In_pSn_qTe_rGe_sSb_t$ (where $0 \leq p \leq 0.3$, $0 \leq q \leq 0.3$, $0 < p+q \leq 0.3$, $0 \leq r < 0.1$, $0 < s \leq 0.2$, $0.5 \leq t \leq 0.9$, $p+q+r+s+t=1$). When Te and In and/or Sn are simultaneously used, it is preferable that $(p+q)/r \geq 2$.

The film thickness of the recording layer is preferably not less than 5 nm in order to obtain sufficient optical contrast, and increase the crystallization speed to achieve record erasure within a short time. In order to sufficiently increase the reflectance, the film thickness of the recording layer is more preferably not less than 10 nm.

In order to prevent occurrence of cracks and obtain sufficient optical contrast, the film thickness of the recording layer is preferably not larger than 100 nm, and more preferably 50 nm. A reason of this is to decrease the heat capacity and to increase the recording sensitivity. When the film thickness of the recording layer is within the above range, it is possible to decrease the change in volume with phase-change. Accordingly, it is possible to diminish an effect of repetitive changes in volume on the upper and lower protective layers due to repetitive overwriting. Further, it is possible to suppress accumulation of irreversible microscopic deformation, decrease the noise, and improve the durability to the repetitive overwriting.

Since a high-density recording medium such as a rewritable DVD is required more strictly to meet a noise demand, the film thickness of the recording layer is more preferably not larger than 30 nm.

Generally, the above recording layer can be obtained by DC- or RF-sputtering a predetermined alloy target in an inert gas, particularly Ar gas.

The density of the recording layer is generally not less than 80 percent of the bulk density, and preferably not less than 90 percent. As the bulk density $\rho$ mentioned here, an approximate value generally given by formula (1) below is used, but the bulk density $\rho$ can be surveyed by making a lump of an alloy composition forming the recording layer.

$$\rho = \Sigma m_i \rho_i \quad (1)$$

(where $m_i$ is morality of each element i, and $m_i \rho_i$ is an atomic weight of element i).

In the sputtering deposition method, the pressure of a sputter gas (generally, a rare gas such as Ar or the like. Hereinafter, description will be made by way of Ar) is decreased or the substrate is placed close to the face of the target to increase the quantity of high-energy Ar impinged on the recording layer, whereby the density of the recording layer can be increased. The high-energy Ar is generally either that a part of Ar ions impinged on the target for sputtering are repelled and reaches the substrate's side, or that Ar ions in the plasma are accelerated by a sheath voltage on the whole surface of the substrate and reaches the substrate.

The radiation effect of a rare gas having such high energy is called "Atomic peening" effect. In sputtering with Ar gas generally used, Ar is contaminated in the sputtering film by the Atomic peening effect. On the basis of the quantity of Ar in the film, the Atomic peening effect can be estimated. Namely, when the quantity of Ar is small, it means that high-energy Ar radiation effect is small, thus a film having a low density tends to be formed.

On the other hand, when the quantity of Ar is large, radiation of high-energy Ar becomes significant, and the density of the film becomes high. However, Ar taken into the film precipitates as void at the time of repetitive overwriting, so that the durability to overwriting tends to degrade. Accordingly, discharge is performed within a range of appropriate voltages on the order of $10^{-2}$ to $10^{-1}$ Pa.

[3B] Substrate

As the substrate, it is possible to use resins such as polycarbonate resin, acrylic resin, polyolefin resin and so forth, and glass. Among them, polycarbonate resin is most preferable because it has been widely used in CD-ROMs and the like, and it is low-cost. The thickness of the substrate is generally not less than 0.1 mm, preferably not less than 0.3 mm, on the other hand, preferably not larger than 20 mm, and preferably not larger than 15 mm. Generally, the thickness of the substrate is about from 0.6 mm to 1.2 mm. The optical recording medium of the substrate incident type need to be transparent to laser beams because the substrates need to pass through laser beams. On the other hand, substrates of optical recording medium of the surface incident type do not always need to be transparent.

[3C] Protective Layer

In order to prevent evaporation and deformation with a change in phase of the recording layer and control thermal diffusion at that time, a protective layer is generally formed on either or, preferably, both of the upper and lower surface of the recording layer. Materials of the protective layer are determined, giving attention to index of refraction, thermal conductivity, optical stability, mechanical strength, adhesion, etc. Generally, oxides, sulfides, nitrides and carbides of metals or semiconductors having high transparency and high melting point, and fluorides of Ca, Mg, Li and the like can be used.

In this case, the oxides, sulfides, nitrides, carbides and fluorides do not need to be in the stoichiomtical compound, but the compound may be controlled in order to control the refractive index or the like or they may be mixed and used. When considering the repetitive recording characteristic, a mixture of dielectrics is more preferable. More concretely, there are a mixture of a chalcogenide compound of $Z_nS$, rare earth sulfide or the like, and a heat resisting compound of oxide, nitride, carbide, fluoride or the like. For example, a mixture of a heat resisting compound containing ZnS as the main component, and a mixture of a heat resisting compound containing a rare earth sulfate, particularly $Y_2O_2S$, are preferable examples of composition of the protective layer.

As the material of the protective layer, there is a dielectric material, in general. As the dielectric material, there are oxides of Sc, Y, Ce, La, Ti, Zr, Hf, V, Nb, Ta, Zn, Al, Cr, In, Si, Ge, Sn, Sb, Te and the like, nitrides of Ti, Zr, Hf, V, Nb, Ta, Cr, Mo, W, Zn, B, Al, Ga, In, Si, Ge, Sn, Sb, Pb and the like, carbides of Ti, Zr, Hf, V, Nb, Ta, Cr, Mo, W, Zn, B, Al, Ga, In, Si and the like, and a mixture of these, for example. As the dielectric material, there are sulfides, selenides or tellurides of Zn, Y, Cd, Ga, In, Si, Ge, Sn, Pb, Sb, Bi and the like, fluorides of Mg, Ca, Li and the ilke, and a mixture of these.

As practical examples of the dielectric material, there are $ZnS$—$SiO_2$, SiN, $SiO_2$, $TiO_2$, CrN, $TaS_2$, $Y_2O_2S$, etc. Among these materials, $ZnS$—$SiO_2$ is widely used because of its high deposition rate, small film stress, small volume change rate with changes in temperature and excellent weather-proof property. When $ZnS$—$SiO_2$ is used, the composition ratio $ZnS:SiO_2$ of Zns to $SiO_2$ is generally 0:1 to 1:0, preferably 0.5:0:5 to 0.95:0.05, more preferably 0.7:0.3 to 0.9:0.1. It is most preferable that $ZnS:SiO_2$ is 0.8:0.2.

More concretely, a composite dielectric containing not less than 50 mol percent and not larger than 90 mol percent rare-earth sulfide of La, Ce, Nd, Y or the like, or a composite dielectric containing not less than 70 mol percent and not larger than 90 mol percent Zns and $TaS_2$ is desirable.

When the repetitive recording characteristic is considered, it is desirable that the film density of the protective layer is not less than 80 percent of the bulk state in the standpoint of mechanical strength. When a mixture of dielectrics is used, a theoretical density of the known formula (1) mentioned above is used as the bulk density.

The thickness of the protective layer is generally not less than 1 nm and not larger than 500 nm. When the thickness of the protective layer is not less than 1 nm, an effect of preventing the substrate and recording layer from deforming can be sufficiently secured, and the protective layer can fulfill its role. When the thickness of the protective layer is not larger than 500 nm, the internal stress of the protective layer itself, a difference in elastic characteristic between the protective layer and the substrate, and the like are remarkable, whereby regeneration of cracks can be prevented.

When a protective layer (referred to as a lower protective layer, occasionally) is provided between the substrate and the recording layer, the thickness of the protective layer is generally not less than 1 nm, preferably not less than 5 nm, more preferably 10 nm, still more preferably 20 nm, and particularly preferably 40 nm, because the lower protective layer is required to suppress deformation of the substrate due to heat. Doing so can suppress accumulation of microscopic deformation of the substrate during repetitive recording, and prevent the noise from increasing because the read beam is scattered.

On the other hand, the thickness of the lower protective layer is generally not larger than 400 nm, preferably not larger than 300 nm, more preferably not larger than 200 nm, still more preferably not larger than 150 nm, and particularly preferably not larger than 100 nm from the relation with time necessary for deposition. Doing so can prevent the groove geometry on the substrate seen on the plane of the recording layer from changing. Namely, a phenomenon that the depth or width of the groove becomes smaller than an intended shape on the surface of the substrate is hard to occur.

On the other hand, when the protective layer (referred to as an upper protective layer, occasionally) is provided on the opposite side of the substrate of the recording layer, the thickness of the upper protective layer is generally not less than 1 nm, preferably not less than 5 nm, more preferably not less than 10 nm, and still more preferably not less than 15 nm in order to suppress deformation of the recording layer. In order to avoid accumulation of microscopic plastic deformation inside the upper protective layer generating due to repetitive recording, and suppress noise from increasing due to read beam scattering, the thickness of the upper protective layer is preferably not larger than 200 nm, more preferably not larger than 150 nm, more preferably not larger than 100 nm, still more preferably not larger than 60 nm, particularly preferably not larger than 50 nm, and most preferably not larger than 30 nm.

Meanwhile, the thicknesses of the recording layer and the protective layer are so selected as to provide a good absorption efficiency of the laser beam and a large amplitude of recording signals, that is, a large contrast between the recorded state and the unrecorded state, in consideration of not only limitations of mechanical strength and reliability but also interference effect due to the multilayer structure.

The protective layer is generally formed in sputtering. It is preferable that the total quantity of impurities including the quantity of impurities of the target, and the quantities of water and oxygen mixed at the time of deposition is less than 2 atomic-percent. For this reason, when the protective layer is formed in sputtering, it is preferable that the ultimate background vaccum pressure in the process chamber is less than $1 \times 10^{-3}$ Pa when the protective layer is formed in sputtering.

[3D] Reflective Layer

A reflective layer can be also provided in the optical recording medium. A position at which the reflective layer is provided generally depends on the incident direction of the read beam. The reflective layer is provided on the opposite side of the recording layer with respect to the incident side. Namely, when the read beam is inputted from the substrate's side, the reflective layer is generally arranged on the opposite side of the recording layer with respect to the substrate. When the read beam is inputted from the recording layer's side, the reflective layer is generally arranged between the recording layer and the substrate.

A material used for the reflective layer is preferably a substance having a higher reflectivity. Particularly, a metal such as Au, Ag or Al that can be expected to give the heat-dissipation effect is preferable, as well. The heat-dissipation performance is determined from the film thickness and the thermal conductivity. The thermal conductivity is approximately proportional to the volume resistivity in these metals, thus the heat-dissipation performance can be expressed by the sheet resistivity. The sheet resistivity is generally not less than 0.05 Ω/□, preferably not less than 0.1 Ω/□, on the other hand, generally not larger than 0.6 Ω/□, and preferably not larger than 0.5 Ω/□.

This assures that the heat-dissipation is high, which is necessary to suppress re-crystallization to some degree when competition between amorphization and crystallization at the time of formation of an amorphous mark is noticeable as in the recording layer used in the optical recording medium. A small amount of Ta, Ti, Cr, Mo, Mg, V, Nb, Zr, Si or the like may be added to the above metal in order to control the thermal conductivity of the reflective layer itself or improve the corrosion resistance, the quantity of which is generally not less than 0.01 atomic-percent and not larger than 20 atomic-percent.

As a more concrete example of the material of the reflective layer suited to this invention, an Al alloy containing Al and at least one element selected from a group consisting of Ta, Ti, Co, Cr, Si, Sc, Hf, Pd, Pt, Mg, Zr, Mo and Mn. Since it is known that these alloys improve anti-hillock performance, these alloys can be used in consideration of durability, volume resistivity, deposition rate, etc. The content of the above element is generally not less than 0.1 atomic-percent, preferably not less than 0.2 atomic-percent, on the other hand, generally not larger than 2 atomic-percent, and preferably not larger than 1 atomic-percent. When the quantity of the added impurity is too small, the anti-hillock performance of the Al alloy is insufficient although it depends on the deposition conditions. When the quantity of the added impurity is too much, it is difficult to obtain a sufficient heat-dissipation effect.

As a concrete example of the aluminum alloy, there is an aluminum alloy containing not larger than 15 atomic-percent at least either one of Ta and Ti. Particularly, an alloy, $Al_\alpha Ta_{1-\alpha}$ ($0 \leq \alpha \leq 0.15$), has an excellent corrosion resistance, which is thus a particularly preferable material of the reflective layer in viewpoint of improving the reliability of optical recording medium.

As preferable examples of the reflective layer materials, there are pure Ag, and an Ag alloy containing Ag and at least one element selected from a group consisting of Ti, V, Ta, Nb, W, Co, Cr, Si, Ge, Sn, Sc, Hf, Pd, Rh, Au, Pt, Mg, Zr, Mo Cu, Zn, Mn and a rare earth element. When importance is given to archival stability, Ti, Mg or Pd is preferable as a component to be added. The content of the above element is generally not less than 0.01 atomic-percent, preferably not less than 0.2 atomic-percent, on the other hand, generally not larger than 10 atomic-percent, and preferably not larger than 5 atomic-percent.

Particularly, an Ag alloy containing Ag and not less than 0.01 atomic-percent and not larger than 10 atomic-percent any one of Mg, Ti, Au, Cu, Pd, Pt, Zn, Cr, Si Ge and a rare earth element has a high reflectance and a thermal conductivity together with excellent heat-resistance, which is thus preferable.

When the film thickness of the upper protective layer is not less than 40 nm and not larger than 50 nm, it is preferable that the added element to be contained is not larger than 2 atomic-percent in order that the reflective layer is of a high thermal conductivity, in particular.

Particularly preferable as a material of the reflective layer is that Ag is used as the main component. And, most preferable is that Ag is pure Ag. Why it is preferable to use Ag as the main component is as follows. Namely, when a recording mark stored for a long time is re-recorded, a phenomenon that the re-crystallization speed of the phase-change recording layer is increased in only the first recording immediately after the recording mark is stored may occur. A reason why such phenomenon occurs is unknown. However, it is supposed that the size of an amorphous mark formed in the first recording after stored becomes smaller than a desired size of the mark because the recrystallization speed of the recording layer immediately after stored is increased. To cope with occurrence of such phenomenon, the cooling rate of the recording layer is increased by using Ag having extremely high heat dissipation characteristics in the reflective layer to suppress re-crystallization of the recording layer in the first recording immediately after the mark is stored, whereby the size of the amorphous mark can be kept in a desired size.

In order to completely reflect the incident beam without any transmitted beam, the thickness of the reflective layer is generally not less than 10 nm, preferably not less than 20 nm, more preferably not less than 40 nm, and still more preferably not less than 50 nm. When the thickness is excessive, the productivity degrades and a crack tends to generate without a change in the heat dissipating effect. Therefore, the thickness of the protective layer is generally not larger than 500 nm, preferably not larger than 400 nm, more preferably not larger than 300 nm, and still more preferably not larger than 200 nm.

Meanwhile, the reflective layer is generally formed in sputtering or vacuum evaporation. It is preferable that the total quantity of impurities including the quantity of impurities contained in the target and an evaporation material themselves, and the quantities of water and oxygen mixed at the time of film deposition is less than 2 atomic-percent. When the reflective layer is formed in sputtering, it is desirable that the ultimate background vacuum pressure is less than $1 \times 10^{-3}$ Pa.

When the film is deposited at a ultimate background vacuum pressure poorer than $10^{-4}$ Pa, the film deposition rate is not less than 1 nm/second or preferably not less than 10 nm/second to prevent an impurity from being mixed therein. When higher than 1 atomic-percent an added element is intentionally contained, it is desirable that the film deposition rate is not less than 10 nm/second in order to prevent an additional impurity from being mixed therein as much as possible.

It is possible to form the reflective layer with multiple layers in order to obtain a higher thermal conductivity and reliability. In such case, it is preferable that at least one layer is made of the above material having a thickness of not less than 50 percent of a sum of thicknesses of all the reflective layers. This layer virtually gives an effect of heat dissipation, whereby other layers can improve the corrosion resistance from other layers, adhesion to the protective layer and antihillock property.

When the reflective layer containing pure Ag or Ag as the main component is provided in contact with the protective layer containing ZnS or the like containing sulfur, an interface layer not containing sulfur is generally provided in order to avoid corrosion caused by reaction between Ag and sulfur. In which case, it is preferable that the interface layer is a metal functioning as the reflective layer. As the material of the interface layer, there are Ta and Nb. In this case, it can be considered that the first protective layer, the phase-change recording layer, the second protective layer, the interface layer and the reflective layer (here, it can be considered that the boundary layer and the reflective layer together form a multi-reflective layer) are formed in this order on the substrate.

It is preferable that film deposition is performed in an in-line apparatus in which a target for the recording layer, a target for the protective layer, and a target for reflective layer material when necessary are arranged in the same vacuum chamber in order to avoid oxidation and contamination among layers. This is also excellent in the standpoint of the productivity.

[3E] Protective Coating Layer

It is preferable that a protective coating layer formed by a UV-curing resin or a thermosetting resin is provided in order to prevent direct contact with air or prevent flaws due to contact with foreign materials. The thickness of the protective coating layer is generally from 1 μm to several hundreds μm. It is also possible to further provide a dielectric protection layer of a high hardness, or a resin layer thereon.

[3F] Others

As having been described by way of example where the rewritable DVD is single-layered, but the present invention can be applied to another structure (for example, a double-layered, a multi-layered more than double-, a double-layered of a single-sided incident type or double-sided incident type).

According to the optical recording method of this embodiment, a rewritable optical recording medium of a large capacity such as a rewritable DVD, for example, is used as a write-once optical recording medium (write-once medium), and (a) recording pulse(s) is used according to the recording velocity, whereby high-velocity recording in large-capacity optical recording medium can be realized.

[Working Example]

Next, the present invention will be described in more detail by way of a working example. Note that the prevent invention is not limited to the working example below.

On a polycarbonate substrate with a track pitch of 0.74 μm, a groove width of 0.32 μm, a groove depth of 32 nm and a thickness of 0.6 mm, an 80 nm thick $(ZnS)_{80}(SiO_2)_{20}$ protective layer, a 14 nm thick $In_3Ge_3Sb_{70}Te_{20}$ recording layer, a 22 nm thick $(ZnS)_{80}(SiO_2)_{20}$ protective layer, a 2 nm thick Ta diffusion preventive layer, and a 100 nm thick Ag reflective layer were formed in this order in sputtering using Ar gas.

Deposition of each layer was carried out after the ultimate background vacuum pressure reached $4 \times 10^{-4}$ Pa.

The first protective layer was formed in RF sputtering, introducing Ar gas at a deposition pressure of $2.6 \times 10^{-1}$ Pa and at a deposition power of 2 kW.

The recording layer was formed in RF sputtering at a deposition pressure of $2.1 \times 10^{-1}$ Pa and at a deposition power of 300 W.

The second protective layer was formed in RF sputtering at a deposition pressure of $3.9 \times 10^{-1}$ Pa and at a deposition power of 1.2 kW.

The diffusion protective layer was formed in DC sputtering at a deposition pressure of $1.7 \times 10^{-1}$ Pa and at a deposition power of 500 W.

The reflective layer was formed in DC sputtering at a deposition pressure of $6.4 \times 10^{-1}$ Pa and at a deposition power of 750 W.

A protective coating made of a UV-curing resin was applied thereon, then laminated to a polycarbonate substrate having a thickness of 0.6 mm to form a disk (optical recording medium) having a thickness of 1.2 mm.

This disk was initialized with a high-power semiconductor laser at a linear velocity of 5 m/s. The initializing laser power was 1400 W.

Optical disk tester DDU 1000 manufactured by PULSTEC having a wavelength of 650 nm and NA=0.65 was used to evaluate characteristics of recording and recorded signals.

The reference linear velocity was 3.49 m/s which is the reference linear velocity of DVD, and the reference clock frequency was 26.2 MHz (clock cycle $T_s$=38.2 ns). EFM+ signals were recorded at each velocity, then clock jitter was measured at the reference linear velocity.

Here, clock jitter was that retrieved signals were passed through an equalizer and a LPF, and converted into binary signals by a slicer, and the standard deviation of time fluctuation (jitter) of the leading edge and the trailing edge of the binary signal to PLL clocks were normalized with clock period T. Details of the measuring method are defined in DVD-ROM standards or rewritable DVD standards.

Table 1 below shows a writing strategy (1 T divided pulse strategy) actually used, with the recording linear velocity being 1-times, 2.4-times and 4-times velocity. In the strategy shown in Table 1, $\alpha_i$ (where i is a natural number from 2 to m) was a constant at each linear velocity, $\beta_k$ (where k is a natural number from 2 to m−1) was constant as well, and the strategy shown in Table 1 had a highest regularity among the 1 T divided pulse strategy described in the above embodiment. Incidentally, $\beta_{i-1}+\alpha_i$ was 1 (where i is 3 to m−1)

TABLE 1

| linear recording velocity | $\alpha_1$ | $\beta_1$ | $\alpha_2$~$\alpha_m$ | $\beta_2$~$\beta_{m-1}$ | $\beta_m$ |
|---|---|---|---|---|---|
| 1-times velocity | 0.25 | 0.81 | 0.20 | 0.80 | 0.92 |
| 2.4-times velocity | 0.45 | 0.55 | 0.35 | 0.65 | 0.35 |
| 4-times velocity | 0.50 | 0.50 | 0.50 | 0.50 | 0.10 |

Table 2 shows laser powers and clock jitter of signals recorded with the laser powers when such the 1 T divided pulse strategy was employed.

TABLE 2

| linear recording velocity | jitter (%) | PwL (mW) | Pe (mW) | PbL (mW) |
|---|---|---|---|---|
| 1-times velocity | 6.2 | 17.0 | 7.0 | 0.5 |
| 2.4-times velocity | 7.2 | 18.0 | 5.5 | 0.5 |
| 4-times velocity | 6.3 | 19.0 | 4.0 | 0.5 |

It is found that the clock jitter was not larger than 9% at any linear velocity, thus was excellent.

Writing strategies (2 T divided pulse strategy) actually used when the recording linear velocity was 1 times, 2.4 times and 4 times the reference linear velocity are shown in Table 3, Table 4 and Table 5.

In Tables 3, 4 and 5, a coefficient $\alpha'_i$ of a rcordng pulse length and a coefficient $\beta'_i$ of a cooling pulse length defining the strategy for odd-number marks (when n is an odd number in the nT mark) are shown in columns of $\alpha_i$ and $\beta_i$, respectively.

TABLE 3

| nT mark | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|
| 3 | 0.56 | 1.69 | | | | | | | | | | | | |
| 4 | 0.38 | 1.56 | 0.44 | 1.06 | | | | | | | | | | |
| 5 | 0.38 | 2.44 | 0.56 | 1.06 | | | | | | | | | | |
| 6 | 0.38 | 1.56 | 0.44 | 1.56 | 0.44 | 1.06 | | | | | | | | |
| 7 | 0.38 | 1.56 | 0.44 | 2.44 | 0.56 | 1.06 | | | | | | | | |
| 8 | 0.38 | 1.56 | 0.44 | 1.56 | 0.44 | 1.56 | 0.44 | 1.06 | | | | | | |
| 9 | 0.38 | 1.56 | 0.44 | 1.56 | 0.44 | 2.44 | 0.56 | 1.06 | | | | | | |
| 10 | 0.38 | 1.56 | 0.44 | 1.56 | 0.44 | 1.56 | 0.44 | 1.56 | 0.44 | 1.06 | | | | |
| 11 | 0.38 | 1.56 | 0.44 | 1.56 | 0.44 | 1.56 | 0.44 | 2.44 | 0.56 | 1.06 | | | | |
| 14 | 0.38 | 1.56 | 0.44 | 1.56 | 0.44 | 1.56 | 0.44 | 1.56 | 0.44 | 1.56 | 0.44 | 1.56 | 0.44 | 0.16 |

TABLE 4

| nT mark | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|
| 3 | 1.00 | 1.19 | | | | | | | | | | | | |
| 4 | 0.63 | 1.25 | 0.75 | 0.75 | | | | | | | | | | |
| 5 | 0.63 | 1.81 | 1.13 | 0.75 | | | | | | | | | | |
| 6 | 0.63 | 1.25 | 0.75 | 1.25 | 0.75 | 0.75 | | | | | | | | |
| 7 | 0.63 | 1.25 | 0.75 | 1.81 | 1.13 | 0.75 | | | | | | | | |
| 8 | 0.63 | 1.25 | 0.75 | 1.25 | 0.75 | 1.25 | 0.75 | 0.75 | | | | | | |
| 9 | 0.63 | 1.25 | 0.75 | 1.25 | 0.75 | 1.81 | 1.13 | 0.75 | | | | | | |
| 10 | 0.63 | 1.25 | 0.75 | 1.25 | 0.75 | 1.25 | 0.75 | 1.25 | 0.75 | 0.75 | | | | |
| 11 | 0.63 | 1.25 | 0.75 | 1.25 | 0.75 | 1.25 | 0.75 | 1.81 | 1.13 | 0.75 | | | | |
| 14 | 0.63 | 1.25 | 0.75 | 1.25 | 0.75 | 1.25 | 0.75 | 1.25 | 0.75 | 1.25 | 0.75 | 1.25 | 0.75 | 0.75 |

TABLE 5

| nT mark | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|
| 3 | 1.69 | 0.06 | | | | | | | | | | | | |
| 4 | 0.69 | 1.13 | 0.88 | 0.31 | | | | | | | | | | |
| 5 | 0.69 | 1.63 | 1.25 | 0.31 | | | | | | | | | | |
| 6 | 0.69 | 1.13 | 0.88 | 1.13 | 0.88 | 0.31 | | | | | | | | |
| 7 | 0.69 | 1.13 | 0.88 | 1.63 | 1.25 | 0.31 | | | | | | | | |
| 8 | 0.69 | 1.13 | 0.88 | 1.13 | 0.88 | 1.13 | 0.88 | 0.31 | | | | | | |
| 9 | 0.69 | 1.13 | 0.88 | 1.13 | 0.88 | 1.63 | 1.25 | 0.31 | | | | | | |
| 10 | 0.69 | 1.13 | 0.88 | 1.13 | 0.88 | 1.13 | 0.88 | 1.13 | 0.88 | 0.31 | | | | |
| 11 | 0.69 | 1.13 | 0.88 | 1.13 | 0.88 | 1.13 | 0.88 | 1.63 | 1.25 | 0.31 | | | | |
| 14 | 0.69 | 1.13 | 0.88 | 1.13 | 0.88 | 1.13 | 0.88 | 1.13 | 0.88 | 1.13 | 0.88 | 1.13 | 0.88 | 0.31 |

Table 6 below shows laser power at each linear velocity and clock jitter of signals recoded under the recording conditions.

TABLE 6

| linear recording velocity | Clock jitter (%) | PwL (mW) | Pe (mW) | PbL (mW) |
|---|---|---|---|---|
| 1-times velocity | 6.1 | 14 | 5.9 | 0.5 |
| 2.4-times velocity | 6.0 | 14 | 6 | 0.5 |
| 4-times velocity | 5.8 | 15 | 4.7 | 0.5 |

It is found that the clock jitter was not larger than 9% at any linear velocity, thus was excellent.

In order to confirm a region in which rewritable recording is possible, clock jitter of recording signals overwritten ten times was measured using the recording strategy shown in Table 1 above. Results of this are shown in Table 7 below. The clock jitter was not larger than 9% up to the 4-times velocity, thus excellent results were obtained.

TABLE 7

| Linear recording velocity | Clock jitter (%) after 10-times over-writing |
|---|---|
| 1-times velocity | 6.8 |
| 2.4-times velocity | 7.3 |
| 4-times velocity | 8.2 |
| 5-times velocity | 11.0 |

Further, overwriting was tried ten times at the 5-times velocity by applying a recording power PwL: 21 mW, an erasing power Pe: 4 mW and a bias power PbL: 0.5 mW as the laser power using the recording strategy (1 T divided pulse strategy) shown in Table 8. Results of this are shown in Table 7, where the clock jitter was 11.0%.

TABLE 8

| Recording linear velocity | $\alpha_1$ | $\beta_1$ | $\alpha_2\sim\alpha_m$ | $\beta_2\sim\beta_{m-1}$ | $\beta_m$ |
|---|---|---|---|---|---|
| 5-times velocity | 0.56 | 0.44 | 0.56 | 0.44 | 0.06 |

It is generally said that no read error occurs in DVD when the clock jitter is not larger than 10%. Accordingly, it is adequate in this working example that the 4-times velocity is determined to be the upper limitation of a range in which overwriting is possible, from the results of measurement of the clock jitter after overwriting was performed ten times shown in Table 7 above.

Accordingly, at linear velocities not less than 5-times velocity, which exceeds the rewritable range, write-once recording was carried out using a strategy in which one pulse (block pulse) was used for recording described above in the above example. A strategy actually used is shown in Table 9 below.

TABLE 9

| nT mark | $T_{dk}$ | $\gamma$ | pulse length (T) |
|---|---|---|---|
| 3 | 0.3 | 0.5 | 2.2 |
| 4 | 0.2 | 0.5 | 3.3 |
| 5 | 0.1 | 0.5 | 4.4 |
| 6 | — | 0.5 | 5.5 |
| 7 | — | 0.5 | 6.5 |
| 8 | — | 0.5 | 7.5 |
| 9 | — | 0.5 | 8.5 |
| 10 | — | 0.5 | 9.5 |
| 11 | — | 0.5 | 10.5 |
| 14 | — | 0.5 | 13.5 |

The strategy used in this working example was obtained by further limiting the block pulse strategy described in the above embodiment, wherein $\gamma$ was a constant value 0.5 independent of n. Namely, it can be said that since the coefficient of the clock period of T is fixed even when the linear velocity is varied according to a radial position on an optical disk like done in CAV recording, the recording pulse control is easier for the recording/retrieving apparatus.

Table 10 below shows jitter and laser powers PwH and PbH required for recording in write-once recording at 5-times to 16-times velocities in the strategy shown in Table 9 above.

TABLE 10

| recording linear velocity | clock jitter (%) | PwH (mW) | PbH (mW) |
|---|---|---|---|
| 5-times velocity | 7.9 | 13.0 | 3.5 |
| 6-times velocity | 6.1 | 13.0 | 3.5 |
| 8-times velocity | 5.7 | 13.0 | 3.5 |
| 10-times velocity | 6.0 | 14.0 | 3.5 |
| 12-times velocity | 6.1 | 16.0 | 3.5 |
| 14-times velocity | 6.5 | 17.0 | 3.5 |

TABLE 10-continued

| recording linear velocity | clock jitter (%) | PwH (mW) | PbH (mW) |
|---|---|---|---|
| 16-times velocity | 8.2 | 18.0 | 3.5 |

From the above, it is found that the jitter was not larger than 9% in a range from the 5-times velocity to the 16-times velocity, thus an excellent recording characteristic was obtained.

Next, signals were directly overwritten once at the 2.4-times velocity on signals recorded in write-once recording at the 8-times velocity without DC-erasing. The strategy was as shown in Table 1 above (1 T divided pulse strategy). The clock jitter of the overwritten signals was 7.2%. When signals were overwritten once more at the 2.4-times velocity thereupon, the clock jitter was 7.1%. This shows that direct overwriting is possible without DC erasing if the user selects the rewritable recording mode even after a write-once recording is performed.

Next, signals recorded in the write-once recording at the 8-times velocity were erased by radiating once a DC beam of 13 mW at the 1-times velocity, and the write-once recording was performed thereon at the 8-times velocity. The strategy was as shown in Table 9 above. It was confirmed that the clock jitter was 7% when the clock jitter of the signals was measured. This shows that signals can be recorded again in the write-once recording at a high velocity on signals recorded in the write-once recording after DC-erasing is performed if the user selects so.

INDUSTRIAL APPLICABILITY

As described above in detail, the optical recording method and the recording/retrieving apparatus according to this invention can realize high-velocity recording in a large-capacity optical recording medium by using a large-capacity optical recording medium such as a rewritable DVD as a write-once optical recording medium (write-once medium), for example, and using (a) recording pulse(s) according to a recording velocity.

As having been described in detail by way of specific modes, it is obvious to persons skilled in the art that the present invention can be changed and modified in various ways without departing from the scope of the invention.

This application is based on Japanese Patent Application (Japanese Patent Application No. 2002-363145) filed on 13th of Dec., 2002, the whole of which is incorporated by reference.

The invention claimed is:

1. An optical recording method wherein information is recorded by forming recording marks in an amorphous state with various lengths on a crystalline state which is used as an unrecorded/erased state, in a phase-change recording layer of a rewritable optical recording medium having said phase-change recording layer, characterized in that:

using one block pulse as a recording pulse to form one recording mark when a recording velocity is higher than a rewritable recording velocity;

advancing the end timing of said block pulse by a first predetermined time period from the end timing of a data signal pulse when a length of said recording mark is not less than a predetermined length;

delaying the start timing of said block pulse by a second predetermined time period from the start timing of the data signal pulse and advancing the end timing of said block pulse by a first predetermined time period from the end timing of said data signal pulse when the length of said recording mark is shorter than the predetermined length; and when the recording velocity is not higher than the rewritable recording velocity, using a pulse train comprised of a plurality of recording pulses as the recording pulse to form one recording mark.

2. The optical recording method according to claim 1, wherein said pulse train is comprised of a forefront pulse at a recording power level, a following pulse train in which a pair of a cooling pulse at a cooling power level and a recording pulse at a recording power level is repeated, and a rearmost cooling pulse;

when a recording mark with a length of nT (where n is a natural number not less than 3, and T is a clock period) is formed, the sum of a pair of the pulse width of one cooling pulse and the pulse width of one recording pulse in said following pulse train is approximately 2 when n is an even number.

3. The optical recording method according to claim 1, wherein said pulse train is comprised of a forefront pulse at a recording power level, a following pulse train in which a pair of a cooling pulse at a cooling power level and a recording pulse at the recording power level is repeated, and a rearmost coobng pulse;

when a recording mark with a length of nT (where n is a natural number not less than 3, and T is a clock period) is formed, the sum of a pair of the pulse width of one cooling pulse and the pulse width of one recording pulse in said following pulse train, excluding the sum of the first pair of a cooling pulse and a recording pulse and the sum of the last pair of a cooling pulse and a recording pulse among cooling pulses and recording pulses configuring said following pulse train, is approximately 2 when n is an odd number.

4. The optical recording method according to claim 1, wherein said pulse train is comprised of a forefront pulse at a recording power level, a following pulse train in which a pair of a cooling pulse at a cooling power level and a recording pulse at a recording power level is repeated, and a rearmost cooling pulse;

when forming a recording mark with a length of nT (where n is a natural number not less than 3, and T is a clock period), an equal number of recording pulses forming said following pulse train is used irrespective of whether n is an odd number or an even number;

and when n is an odd number, in said following pulse train, making at least one pulse width selected among a pulse width of the first cooling pulse, a pulse width of the first recording pulse, a pulse width of the last cooling pulse, and a pulse width of the last recording pulse differs from a pulse width of the first cooling pulse, a pulse width of the first recording pulse, a pulse width of the last cooling pulse, and a pulse width of the last recording pulse respectively in case of n is an even number.

5. An optical recording method used when information is recorded by forming recording marks in an amorphous state with various lengths, on a crystalline state which is used as an unrecorded/erased state in a phase-change recording layer of a rewritable optical recording medium having said phase-change recording layer, characterized in that:

using one block pulse as a recording pulse to form one recording mark when a recording velocity is higher than a rewritable recording velocity; and when a length of said recording mark is shorter than a predetermined length, delaying the start timing of said block pulse by a predetermined time period which is longer than in case of recording marks longer than said predetermined length.

6. A recording/retrieving apparatus wherein information is recorded by forming recording marks in an amorphous state with various lengths, on a crystalline state which is used as an unrecorded/erased state, in a phase-change recording layer of a rewritable optical recording medium having said phase-change recording layer, characterized in that:

using one block pulse as a recording pulse to form one recording mark when a recording relocity is higher than a rewritable recording relocity, advancing the end timing of said block pulse by a first predetermined time period from the end timing of a data signal pulse when a length of said recording mark is not less than a predetermined length, and delaying the start timing of said block pulse by a second predetermined time period from the start timing of the data signal pulse and advancing the end timing of said block pulse by a first predetermined time period from the end timing of said data signal pulse when the length of said recording mark is shorter than the predetermined length; and when the recording velocity is not higher than the rewritable recording velocity, using a pulse train comprised of a plurality of recording pulses as a recording pulse to form one recording mark.

* * * * *